(12) United States Patent
Ikegami

(10) Patent No.: US 7,742,896 B2
(45) Date of Patent: Jun. 22, 2010

(54) MEASURED VALUE TRANSFORMATION METHOD AND MEASURED VALUE TRANSFORMATION SYSTEM

(76) Inventor: Takanori Ikegami, 24-37, Narimasu 4-chome, Itabashi-ku, Tokyo (JP) 1750094

( * ) Notice: Subject to any disclaimer, the term of this patent is extended or adjusted under 35 U.S.C. 154(b) by 487 days.

(21) Appl. No.: 11/718,200

(22) PCT Filed: Oct. 27, 2005

(86) PCT No.: PCT/JP2005/019813

§ 371 (c)(1),
(2), (4) Date: Apr. 27, 2007

(87) PCT Pub. No.: WO2006/049084

PCT Pub. Date: May 11, 2006

(65) Prior Publication Data

US 2009/0150119 A1    Jun. 11, 2009

(30) Foreign Application Priority Data

Oct. 30, 2004    (JP)    ............... P2004-344916
Apr. 21, 2005    (JP)    ............... P2005-151553
Jul. 29, 2005    (JP)    ............... P2005-243388

(51) Int. Cl.
G06F 17/00 (2006.01)
G01D 1/00 (2006.01)

(52) U.S. Cl. ............... 702/179; 702/127; 702/187; 708/820

(58) Field of Classification Search ............... 702/179, 702/127, 187
See application file for complete search history.

(56) References Cited

U.S. PATENT DOCUMENTS

| 4,907,191 A | * | 3/1990 | Sato ............... 707/200 |
| 5,361,217 A | * | 11/1994 | Makimura et al. ............... 702/152 |
| 2003/0000097 A1 | * | 1/2003 | Docros ............... 33/521 |

FOREIGN PATENT DOCUMENTS

JP    2002-156433    5/2002

(Continued)

OTHER PUBLICATIONS

Takamasu, et al. "Estimation of Uncertainty in Feature Based Metrology (1st Report)", Journal of Japan Society of Preceision Engineering, 67(1):91-95 (2001) with English Language Abstract.

(Continued)

Primary Examiner—Hal D Wachsman
(74) Attorney, Agent, or Firm—Ostrolenk Faber LLP

(57) ABSTRACT

A plurality of first measured values ($x_i$) are obtained by respectively measuring a plurality of measuring objects in a plurality of first measuring systems and a plurality of second measured values ($y_i$) are obtained by respectively measuring the plurality of measuring objects in a plurality of second measuring systems, and a combination of a first measured value and a second measured value corresponding to each other is obtained as a sample point ($P_i$). A transformation function representing a relationship between a first reconstituted system derived from the plurality of first measuring systems and a second reconstituted system derived from the plurality of second measuring system is obtained statistically processing a plurality of sample points of the plurality of measuring objects. Subsequently, a transformed value ($\tau_i$) is obtained by transforming a second measured value ($y_i$) with the transformation function.

26 Claims, 18 Drawing Sheets

FOREIGN PATENT DOCUMENTS

| | | |
|---|---|---|
| JP | 2002-267436 | 9/2002 |
| JP | 2003-114116 | 4/2003 |
| JP | 2003-121131 | 4/2003 |
| WO | WO 01/10518 | 2/2001 |

OTHER PUBLICATIONS

Ikegami, T., "Standardization of the marathon performance time", Proceeding of the Symposium on Biological and Physiological Engineering, 87-88 (2004) with English Language Abstract.

International Preliminary Report on Patentability, May 1, 2007.

Translation of the International Preliminary Report on Patentability in connection with the corresponding PCT application, PCT/JP2005/19813, May 1, 2007.

"Toward A More Accurate Measure Of The Cost Of Living (Final Report)," The Boskin Commission Report from the Advisory Commission To Study The Consumer Price Index, pp. 1-69, Dec. 4, 1996.

* cited by examiner

MEASURED VALUE TRANSFORMATION METHOD AND MEASURED VALUE TRANSFORMATION SYSTEM

CROSS-REFERENCE TO RELATED APPLICATION

The present application is a 35 U.S.C. §371 national phase conversion of PCT/JP2005/019813 filed Oct. 27, 2005, which claims priority of Japanese Patent Application No. P2004-344916 filed Oct. 30, 2004, Japanese Patent Application No. P2005-151553 filed Apr. 21, 2005 and Japanese Patent Application No. P2005-243388 filed Jul. 29, 2005, which are incorporated herein in their entirety.

TECHNICAL FIELD

The present invention relates to a method and a system for transformation of measured values.

BACKGROUND ART (Measurement and Measured Value)

Measurement is to compare an amount to be measured (hereinafter "measurand") of an object or a phenomenon to be measured (hereinafter "measuring object") with an amount used as a reference to express with a numerical value or a reference sign, and a value obtained by measurement is called "measured value".

(Measuring System)

A system which is composed with objects and necessary functions while collecting the functions for the purpose of measurement of a certain amount is called "measuring system". In FIG. 1, a schematic view of the measuring system is shown. The measuring system includes all of the measurer, measuring instrument, measuring object, and measurement environment.

(Error)

When measurement is performed, an error is included in a measured value. An error is a difference between the measured value and a true value. Here, the true value is an ideal or virtual value introduced for convenience, and actually, the error should be evaluated in a state where the true value is unknown.

(Error Factor)

Error factors in each constituent element of the measuring system are shown in Table 1. Error occurs with these error factors.

TABLE 1

| Constituent Elements of Measuring system | Error Factors |
|---|---|
| Measuring Instrument | Incompleteness of measurement principle |
| | Incompleteness of constitution or operation of measuring instrument |
| | Change of measuring instrument according to difference or variation of measurement environment(s) |
| Measuring Object | Change of measuring object itself according to difference or variation of measurement environment(s) |
| Measurer | Habit or measurement mistake of measurer |

(Classification of Errors)

In general, errors can be dealt with after dividing into systematic errors and random errors.

(Systematic Error)

Systematic errors are a general term of errors arising from factors which bias a population mean of measured values from the true value, out of various error factors. Errors of a measuring instrument, personal error, and the like are belong to this type.

(Random Error)

Random errors are errors which occur from causes which cannot be found out and random errors emerge as dispersion of measured values. Because of this type of errors, even when measurement is repeated in the same conditions, respective measured values are uneven. Since the random errors emerge from causes which cannot be found out and extremely various causes, normally, they are dealt with probabilistically and statistically.

(Model of Measured Value and Error)

Now, with respect to a given measurand of given measuring objects, suppose that the true value is $v$, measured values are $x$, errors in the measured values are $\epsilon$, and systematic errors of $\epsilon$ are $\epsilon_S$ and random errors $\epsilon_R$. A distribution of the random errors $\epsilon_R$ is supposed to be the normal distribution, an average of the measured values $x$ is expressed as $x_{av}$, and a standard deviation is expressed as $\sigma$. In this case, a measured value $x$ and an error $\epsilon$ can be modeled as shown in FIG. 2. Here, the error $\epsilon$ is the sum of a systematic error $\epsilon_S$ and a random error $\epsilon_R$, that is, it is expressed in Equation 1, and the systematic error $\epsilon_S$ is a difference between the population mean $x_{av}$ and the true value $v$, that is, it is expressed in Equation 2.

$$\epsilon = \epsilon_S + \epsilon_R \quad \text{(Equation 1)}$$

$$\epsilon_S = x_{avi} - v \quad \text{(Equation 2)}$$

(Removal of Systematic Errors)

Since the systematic errors are errors which occur according to given regular relationships and have reproducibility, there is a possibility that the measured value can be corrected to a value close to the true value by evaluating an influence of the cause. Therefore, efforts to remove the systematic errors have been performed by utilizing estimation from measurement conditions or measurement theory, or actual measurements where measurement conditions, apparatus, method, or the like are changed.

(Removal of Random Errors)

Since the random errors are errors which occur randomly or probabilistically because of unspecified large number of causes and disperse every measurement, it is impossible to remove them after measurement. However, they can be reduced relatively easily. Because in many cases, the distribution of the random errors may be regarded as the normal distribution and they are considered to disperse at probabilities of the same degree in positive and negative directions, if the average of the results is taken by performing the same measurement many times, it is considered the errors cancel each other to become smaller.

(Correction and Corrected Value)

To compensate a systematic error, a value algebraically added to a measured value or adding a value to it is called correction. Hereinafter, removing a systematic error in a measured value is referred to as "correction", and a corrected measured value is referred to as "corrected value".

(Error in Measured Value and Transformation of Measured Value)

If errors in measured values can not be processed appropriately, it is not possible to ensure validity in transformation results of the measured values. In the following description, methods of dealing with errors in measured values in conventional methodology will be described and their problems will be discussed.

(Correction by Calibration)

Calibration is a process to obtain a relationship between a value indicated by a measuring instrument and a value indicated by a measurement standard or standard sample (hereinafter, "standard value"), and it can be positioned as a means for removing the systematic error derived from a measuring instrument. Also, the relation connecting the standard values and the measured values, which is obtained by calibration, is called a calibration curve. In FIG. 3, an example of the calibration curve is shown. When the standard values indicated by the measurement standard or the like are $s_i$ and the measured values of the measuring instrument to be calibrated are $y_i$, a calibration curve 11 is obtained by plotting points $(s_i, y_i)$ on a standard value-measured value space and fitting a curve to them. In FIG. 3, a straight line 12 indicating y=s is also shown for reference.

(Limit of Correction by Calibration)

In the process of calibration, since it is assumed that there are a measurement standard and a standard material, correction can not be performed in a condition where they are not available. Also, if the measurement environment has changed, not only the measurement instrument but also the measuring object are affected by the change, however, calibration is only a means for removing the systematic error derived from the measuring instrument. As such, calibration is the process for transforming a measured value in a measuring system where measuring is actually performed (hereinafter, "actual measuring system") into a measured value in a measuring system where calibration is performed by using the calibration curve (hereinafter, "calibration system"), and therefore it is not the means for correcting a measured value.

(Correction by Analytical Method)

One of the means for correcting a measured value is an analytical method. For example, a data analysis method or the like based on the design of experiments corresponds to this approach. In FIG. 4, a schematic view of correction based on the analytical method is shown. In the analytical method, first, change of an actually measured value is considered as effects of a finite number of error factors $\alpha_1, \alpha_2 \ldots \alpha_m$, and a math model composed of a linear combination of the products of error factors and coefficients indicating degree of the effects is made. And coefficients composing the math model are determined by data analysis of the actually measured values, and the relationship between true values (criterion variables) $v_1, v_2 \ldots v_n$ and measured values (explanatory variables) $x_1, x_2 \ldots x_n$ are clearly obtained.

(Limit of Correction by Analytical Method)

The analytical method is a way of thinking adopting the symbolism where "If the conditions can be completely transformed into symbols and rules controlling the conditions can be completely clarified, it is possible to explain all phenomena completely". However, in the analytical method, there are problems such as (i) there is no basis for selecting a finite number of error factors from an unspecified number of error factors, (ii) since independence of error factors is unclear, the validity of the math model is not ensured, (iii) since there are many uncertain elements in experiment and observation, convergence of solution is not ensured, or the like. Correction based on the analytical method is extremely complicated and always has uncertainty associated with symbol processing, and therefore it must be a method where the reliability of result of the process is poor.

(Summary of Conventional Correction Methods of Measured Values)

As discussed above, the correction methods of measured values in the present metrology are only limited methods, such as "method where a special instrument or the like is required", "method where the systematic error derived from the measuring instrument is a subject", "method which works only in a special measuring system", "method where the reliability of result of correction can not be ensured", or the like. The limited correction method of measured values means measured values are kept in the measuring system as a specific existence. In the following description, "lack of consistency of a measured value" expresses that a measured value is an existence limited in a specific measuring system and it is not a universal existence over measuring systems. When a measured value in a different measuring system is transformed without consistency of a measured value, the validity in the transformation result can not be ensured. In the following description, such a condition in transformation of a measured value is expressed as "lack of validity in a transformation result of a measured value".

DISCLOSURE OF INVENTION

The present invention is intended to resolve "lack of validity in a transformation result of a measured value" caused by "lack of consistency of measured values". Specifically, in "transformation of a measured value" such as correction of a measured value, calibration of a measured value, comparison of measured values, and the like, "establishment of a metrology ensuring validity in a transformation result of a measured value" is an object.

A measured value transformation method in accordance with the present invention comprises a step of preparing a plurality of first measured values which are obtained by respectively measuring a plurality of measuring objects in a plurality of first measuring systems and a plurality of second measured values which are obtained by respectively measuring the plurality of measuring objects in a plurality of second measuring systems, and obtaining a combination of a first measured value and a second measured value corresponding to each of the plurality of measuring objects as a sample point; a step of obtaining a transformation function representing a relationship between a first reconstituted system derived from the plurality of first measuring systems and a second reconstituted system derived from the plurality of second measuring systems by statistically processing a plurality of sample points of the plurality of measuring objects; and a step of obtaining a transformed value by transforming a second measured value with the transformation function.

By obtaining the transformation function with a statistical processing of the sample points, it is possible to exclude symbols in transformation of a measured value, and prevent occurrence of errors in symbolization, and thereby possible to ensure validity in a transformation result of the measured value.

Here, the plurality of first measuring systems may be different measuring systems from one another, and may be the same collective measuring system. The plurality of second measuring systems may be different measuring systems from one another, and may be the same collective measuring system. The plurality of first measuring systems and the first reconstituted system are the same in the case of the collective measuring system, and the plurality of second measuring systems and the second reconstituted system are also the same in the case of the collective measuring system. That is, expressions of "the plurality of first measuring systems" and "the plurality of second measuring systems" in the case of the collective measuring system are ones only for convenience.

There is a case where distortion or intentionality is included in the plurality of sample points, and in this case, it is preferable to perform selection of the sample points or weighting of the sample points.

Also, typically, a monotonically increasing function including an undetermined coefficient group which is at least one undetermined coefficient as a correlation line is set and the transformation function is obtained as the correlation line where a value group of the undetermined coefficient group is determined.

According to a preferred embodiment of the present invention, the plurality of measuring objects are competitors or competing objects in competing races and the plurality of first measured values are the best records which satisfy a predetermined condition. In this preferred embodiment, it is preferable that each of the plurality of second measured values are replaced with a proportion between a first measured value and a second measured value of a corresponding measuring object and statistically processed.

Also, the present invention is also intended for a measured value transformation system for executing the above measured value transformation method. In the measured value transformation system, it becomes possible to achieve a service for transforming a measured value transmitted from a user and providing the user with a transformation result by communicating with a user terminal through a computer network.

These and other objects, features, aspects and advantages of the present invention will become more apparent from the following detailed description of the present invention when taken in conjunction with the accompanying drawings.

BEST MODE FOR CARRYING OUT THE INVENTION

Black-Box Model

"Method of ensuring validity in transformation results of measured values" can be regarded as "general method in transformation of measured values", and specifically, it can be expressed as "method of ensuring validity in transformation results to function in all the measuring systems, where a special instrument or the like is not needed and systematic errors which derive from all the constituent elements in a measuring system are subjects".

Figure 5:
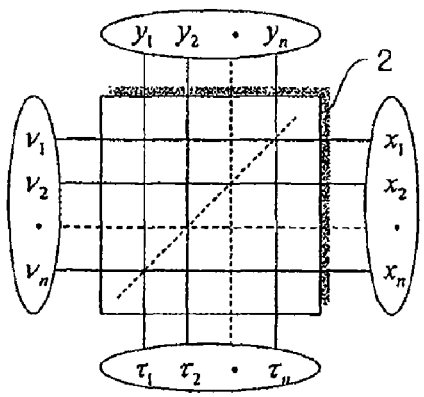
FIG. 5 is a schematic view of a Black-Box Model.

The present invention is achieved by information processing mechanism based on an input-output model which is "a novel general method in transformation of measured values". This general method is called "Black-Box Model". In FIG. 5, a schematic view of the Black-Box Model is illustrated. The Black-Box Model is an input-output model, and input output ends correspond to measured values and a black box part 2 corresponds to a measuring system. In other words, it is a model considered as "when a true value is inputted to a measuring system including an unspecified number of error factors, a measurement value including an error according to the measuring system is outputted". Herein, various transformation of measured values can be achieved by a function of "reconstitution of a measuring system" accompanying the model.

(Black-Box Method)

A method of expressing a complex phenomenon of measurement with the Black-Box Model to transform measured values is called "Black-Box Method".

(Input Information)

As shown in FIG. 5, in the Black-Box Method, the first input information is true values v with respect to a given measurand of a given measuring object. Here, a measuring system of measuring in the standard environment with a measuring instrument calibrated in the standard environment is defined as "standard system S". Since systematic errors do not occur in the standard system S, only random errors are included in measured values. Therefore, if there are many measured values in the standard system S, statistically processed results of them can be used as the true values v. In other words, the true values v can be positioned as measured values in the standard system S.

(Construction of Transformation Process)

In the Black-Box Method, transformation of measured values is composed of "forward process" and "reverse process".

(Forward Process)

"Forward process" is a process where when true values $v_i$ (i=1, 2, 3 . . . n) are inputted to the black box part 2 which is a measuring system, measured values are outputted. Herein, in a case where a measuring system shown by a black box is "first measuring system X", measured values are "first measured values $x_i$" and in a case of "second measuring system Y", measured values are "second measured values $y_i$".

(Reverse Process)

"Reverse process" is a process for reconstituting a measuring system (hereinafter, "reconstituted system") by using first measured values $x_i$ which are obtained by respectively measuring a plurality of measuring objects in a plurality of first measuring systems X and second measured values $y_i$ which are obtained by respectively measuring these plurality of measuring objects in a plurality of second measuring systems Y and for transforming the first measured values $x_i$ and the second measured values $y_i$ as output of the reconstituted system. Here, a reconstituted system derived from the plurality of "first measuring systems X" is "first reconstituted system $X_R$", a reconstituted system derived from the plurality of "second measuring systems Y" is "second reconstituted system $Y_R$", values obtained by transforming the first measured values $x_i$ as measured values in the second reconstituted system $Y_R$ are "first transformed values $\tau^x_i$", and values obtained by transforming the second measured values $y_i$ as measured values in the first reconstituted system $X_R$ are "second transformed values $\tau^y_i$".

(Relationship Between Transformation of Measured Values and Measured Values to be Used)

In the Black-Box Method, properties of measured values to be used determine which of the first transformed values $\tau^x_i$ and the second transformed values $\tau^y_i$ are to be obtained. Therefore, by randomly selecting the first measured values $x_i$ and the second measured values $y_i$, all of these measured values can be transformed into measured values for purposes. However, normally, since only any ones of the first transformed values $\tau^x_i$ and the second transformed values $\tau^y_i$ have values to be converted, the first measured values $x_i$ and the second measured values $y_i$ are selected so that the second transformed values $\tau^y_i$ are acquisition objects. Unless otherwise stated, hereinafter, the first reconstituted system $X_R$ is abbreviated to "reconstituted system $X_R$" and the second transformed values $\tau^y_i$ are abbreviated to "transformed values $\tau_i$".

(Process of Correction of Measured Value)

Discussion will be made on a process of transformation of measured values on the basis of the Black-Box Method by using a problem of "correction of measured values" as a transformation example of measured values.

(Measured Values Used for Correction of Measured Values)

In correction of measured values on the basis of the Black-Box Method, "individually measured values" are used as first measured values and "collectively measured values" are used as second measured values.

(Collectively Measured Values and Collective Measuring System)

"Collectively measured values" are a measured value group where a certain measurand of given measuring objects is measured at the same measuring points (same place and same time). For example, in the measuring object of human, measured values or the like where a measurand such as height, weight, blood pressure, blood glucose level, or the like is measured in a group medical examination or the like correspond to the collectively measured values. In the collectively measured values, there is a high possibility that a constant bias occurs in all the obtained measured values because of measurement time, properties of a measuring instrument to be used, or the like. For example, morning height will be different from evening one, and weight, blood pressure, glucose level or the like greatly change before and after meal or exercise. Furthermore, there are errors of a measuring instrument and habit of a measurer. As described, the collectively measured values are a measured value group where characteristic systematic errors of the measuring system are included in measured values and they need correction for consistency. Also, a measuring system where the collectively measured values are measured is called "collective measuring system".

(Individually Measured Values and Individual Measuring Systems)

"Individually measured values" are measured values where the same measurand of the same measuring objects of the collectively measured values is individually measured in other measuring systems. For example, in the above example of group medical examination, it corresponds to cases where the examinees (the same measuring objects) individually measure weight, blood pressure, and the like (the same measurands) at homes, hospitals, or the like (other measuring systems). In the individually measured values, not only the measuring points but measuring instruments, measurers, and measurement environments in respective measurements are different. That is, in the collectively measured values, all the measured values has a common measuring system (collective measuring system), and conversely, in the individually measured values, respective measured values have different measuring systems. The measuring systems of the individually measured values having such a feature are called "individual measuring systems".

(Forward Process in Correction of Measured Values)

In the forward process in the transformation process of correction of measured values, true values $v_i$ which are input values are inputted to the black box part 2, individually measured values $x_i$ are outputted as measured values in individual measuring systems X, and collectively measured values $y_i$ are outputted as measured values in a collective measuring system Y.

(Reverse Process in Correction of Measured Values)

Conversely, in the reverse process, the individual measuring systems X are reconstituted as a new measuring system $X_R$ on the basis of the individually measured values $x_i$ and the collectively measured values $y_i$, and the collectively measured values $y_i$ are transformed into transformed values $\tau_i$ as measured values in the reconstituted measuring system $X_R$.

(Sample Points)

Figure 6:
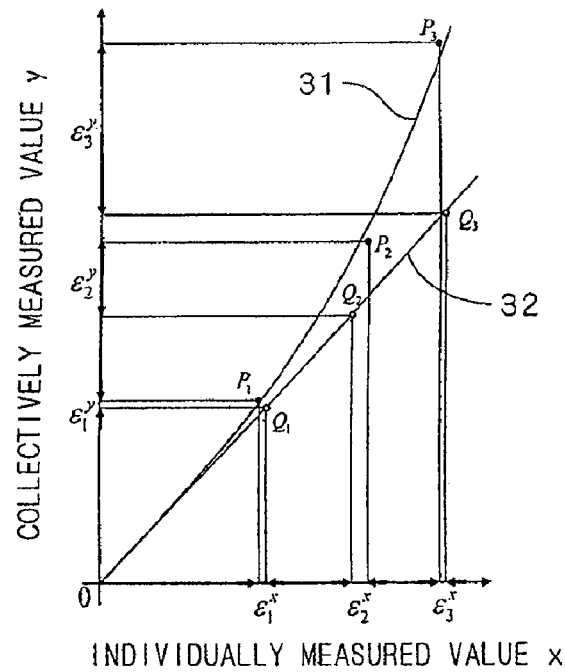
FIG. 6 is a graph showing the principle of correction of measured values.

Now, when individually measured values of a certain measurand of given measuring objects are $x_i$ and collectively measured values are $y_i$, as shown in FIG. 6, $P_i(x_i, y_i)$ which are combinations of them are defined as "sample points". All processes in accordance with transformation of measured values in the Black-Box Method are performed on the basis of the sample points.

(True Values Corresponding to Sample Points)

Since true values of both of the individually measured values $x_i$ and the collectively measured values $y_i$ are $v_i$, true values corresponding to the sample points $P_i(x_i, y_i)$ can be expressed as $Q_i$ ($v_i$, $v_i$). In FIG. 6, in the individually measured value-collectively measured value space, three sample points $P_1$ ($x_1$, $y_1$), $P_2$ ($x_2$, $y_2$) and $P_3$ ($x_3$, $y_3$), and true values $Q_1$ ($v_1$, $v_1$), $Q_2$ ($v_2$, $v_2$) and $Q_3$ ($v_3$, $v_3$) corresponding to them are shown.

(Formulary Expression of Errors in Sample Points)

Errors between the sample points $P_i$ ($x_i$, $y_i$) and the true values $Q_i$ ($v_i$, $v_i$) are represented as ($\epsilon^x_i$, $\epsilon^y_i$), and in the errors, systematic errors and random errors in the individually measured values $x_i$ are represented as $\epsilon^x_{Si}$ and $\tau^x_{Ri}$, and systematic errors and random errors in the collectively measured values $y_i$ are represented as $\tau^y_{Si}$ and $\tau^y_{Ri}$. In this case, the errors $\tau^x_i$ in the x axis direction and the errors $\Sigma^y_i$ in the y axis direction are expressed in Equation 3, and the individually measured values $x_i$ and the collectively measured values $y_i$ are expressed in Equation 4.

$$\begin{cases} \varepsilon^x_i = \varepsilon^x_{Si} + \varepsilon^x_{Ri} \\ \varepsilon^y_i = \varepsilon^y_{Si} + \varepsilon^y_{Ri} \end{cases} \quad \text{(Equation 3)}$$

$$\begin{cases} x_i = v_i + \varepsilon^x_i = v_i + \varepsilon^x_{Si} + \varepsilon^x_{Ri} \\ y_i = v_i + \varepsilon^y_i = v_i + \varepsilon^y_{Si} + \varepsilon^y_{Ri} \end{cases} \quad \text{(Equation 4)}$$

(Properties of Errors in Individually Measured Values)

First, with respect to the errors in the sample points $P_i$ ($x_i$, $y_i$), properties of the errors $\Sigma^x_i$ ($=\Sigma^x_{Si}+\Sigma^x_{Ri}$) in the x axis direction will be discussed. Since the individually measured values $x_i$ are measured values measured in the individual measuring systems X, it is considered that the systematic errors $\Sigma^x_{Si}$ included in them occur randomly in spite of the systematic errors. And naturally, the random errors $\Sigma^x_{Ri}$ are errors which occur randomly. Therefore, the errors $\Sigma^x_i$ in the individually measured values $x_i$ are errors which occur randomly on the whole.

(Properties of Errors in Collectively Measured Values)

Next, with respect to the errors in the sample points $P_i$ ($x_i$, $y_i$), properties of the errors $\Sigma^y_i$ ($=\Sigma^y_{Si}+\Sigma^y_{Ri}$) in the y axis direction will be discussed. Here, since the collectively measured values $y_i$ are the measured value group which is measured in the same measuring system (the collective measuring system), characteristic systematic errors $\Sigma^y_{Si}$ of the measuring system are included in them. However, the random errors $\Sigma^y_{Ri}$ of the collectively measured values $y_i$ are errors which occur randomly.

(Statistical Processing of Sample Points)

Suppose that a certain function 31 is fitted to the sample points $P_i$ ($x_i$, $y_i$) by a statistical processing such as a least square method or the like, as shown in FIG. 6. In this case, in the errors $\Sigma^x_i$ of the individually measured values $x_i$, both of the systematic errors $\Sigma^x_{Si}$ and the random errors $\Sigma^x_{Ri}$ have properties which are allowed to be processed statistically, therefore it is considered that the errors $\Sigma^x_i$ of the individually measured values $x_i$ in the result of the statistical processing of the sample points $P_i$ are approximately 0. On the other hand, in the errors $\Sigma^y_i$ of the collectively measured values $y_i$ in the result of the statistical processing of the sample points $P_i$ ($x_i$, $y_i$), the random errors $\Sigma^y_{Ri}$ are approximately 0, however, a deviation corresponding to the systematic errors $\Sigma^Y_{Si}$ is kept. In FIG. 6, a straight line 32 indicating y=x is also shown for reference.

(Quasi-standard System)

From the above discussion, since the errors $\Sigma^x_i$ in the result of the statistical processing of the individually measured values $x_i$ are approximately 0, a measuring system reconstituted in the statistical processing of the individually measured values $x_i$ has properties which are extremely close to the standard system S. Then, the reconstituted measuring system $X_R$ of the individually measured values $x_i$ is defined as "quasi-standard system S'".

(Corrected Values)

Figure 7:
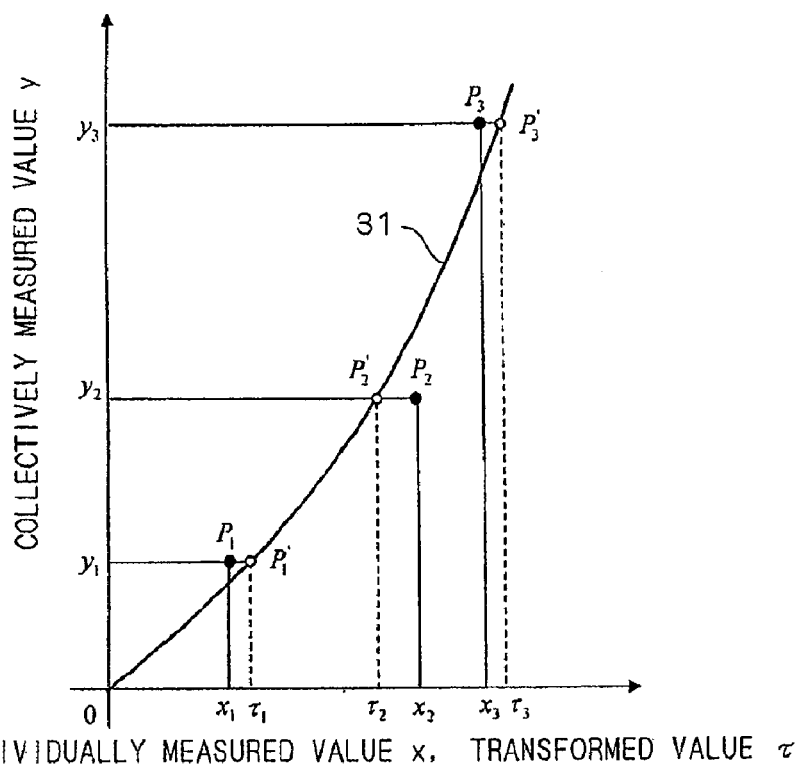
FIG. 7 is a graph showing a transformation function and transformed values.

The sample points $P_i$ ($x_i$, $y_i$) originally represent a relationship between the individually measured values $x_i$ in a horizontal axis and the collectively measured values $y_i$ in a vertical axis, that is, a relationship between the individual measuring systems X and the collective measuring system Y. On the other hand, the function 31 derived from the statistical processing of the sample points is a function representing a relationship between the quasi-standard system S' and the collective measuring system Y, because the errors $\Sigma^x_i$ in the x axis direction in the result of the statistical processing are approximately 0 and in the errors $\Sigma^y_i$ in the y axis direction, only the systematic errors $\Sigma^y_{Si}$ are kept. Since the systematic errors are scarcely included in the measured values in the quasi-standard system S', the measured values where the quasi-standard system S' is the measuring system are extremely close to true values. Therefore, values of the collectively measured values $y_i$ in the horizontal axis turning at this function indicates values where the systematic errors $\Sigma^y_{Si}$ of the collectively measured values $y_i$ are eliminated. From the above discussion, as shown in FIG. 7, values $\tau_i$ where the collectively measured values $y_i$ are transformed by the function 31 derived from the statistical processing are considered to be "corrected values" of the collectively measured values $y_i$.

(Transformation Function)

The function 31 derived from the statistical processing of the sample points $P_i$ ($x_i$, $y_i$) generally carries out a function for transforming the second measured values $y_i$ in the second measuring systems Y into measured values in the $X_R$ which is the reconstituted system of the first measuring systems X. Then, the function 31 derived from the statistical processing of the sample points $P_i$ ($x_i$, $y_i$) in the first measured value-second measured value space is called "measured value transformation function" or simply as "transformation function". In addition, though the plurality of first measuring systems X which are the individual measuring systems are different measuring systems from one another, the plurality of second measuring systems Y where a plurality of measuring objects are respectively measured are the same collective measuring systems, and the second reconstituted system $Y_R$ derived from the plurality of second measuring systems Y are also the same as the second measuring systems Y. However, as discussed later, an example of application where the second measuring systems Y become the individual measuring systems is also assumed, therefore the transformation function can be generally expressed as a function representing a relationship between the first reconstituted system $X_R$ derived from the plurality of first measuring systems X and the second reconstituted system $Y_R$ derived from the plurality of second measuring systems Y. That is, the expression of "the plurality of second measuring systems" relative to the collective measuring system is one for convenience of general expression of the measuring systems.

(Purposive Process)

In the Black-Box Method, properties of a function which is obtained changes by the properties of the first measured values $x_i$ and the second measured values $y_i$. Specifically, as discussed later, by appropriately selecting measured values, it is possible to achieve transformation in accordance with the purposes. By such a reason, the Black-Box Method can be said to be a methodology allowing a purposive process.

(Construction of Transformation Function)

The transformation function is defined as a function including one or more coefficients $a_j$ (j=1, 2, 3 ... m). Also, since the transformation function is a function for the correspondence of the second measured values $y_i$ and the transformed values $\tau_i$, it can be expressed as Equation 5.

$$y_i = f(a_1, a_2, \ldots, a_m, \tau_i) \quad \text{(Equation 5)}$$

(Example of Transformation Function)

As an example of the transformation function including at least one coefficient, one shown in Equation 6 can be given. In addition, in Equation 6, $a_j$ and $A_j$ (j=1, 2, 3 ... m) are coefficients.

$$y = \frac{\tau}{A_1 + A_2 + \ldots + A_m} \left( \frac{A_1}{e^{a_1 \tau^2}} + \frac{A_2}{e^{a_2 \tau^2}} + \ldots + \frac{A_m}{e^{a_n \tau^n}} \right) \quad \text{(Equation 6)}$$

(Correction Function)

Figure 8:
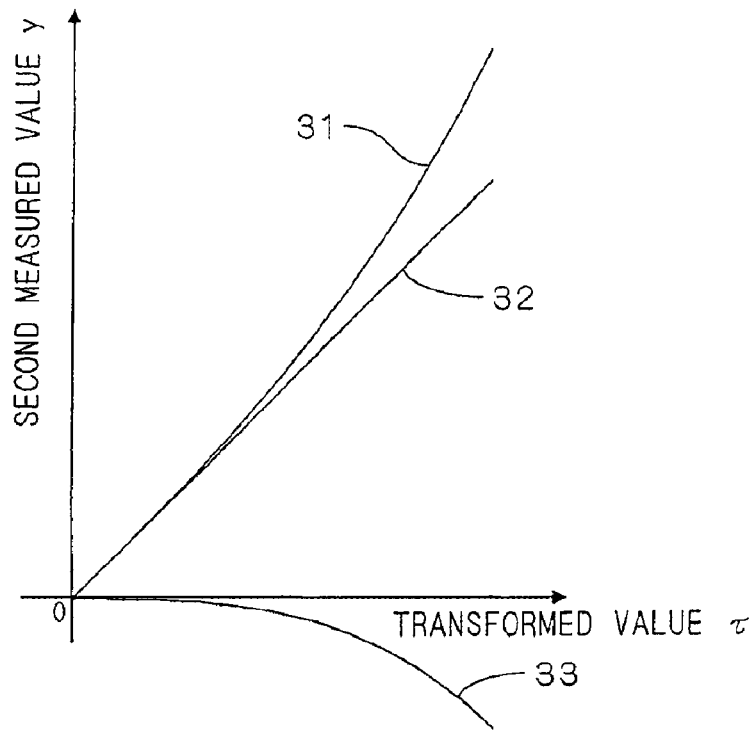
FIG. 8 is a graph showing a transformation function and a correction function.

In addition to the transformation function, a function for an amount of correction is defined. When the transformation function carries out a function of correction, differences $\xi_i$ between the corrected values $\tau_i$ and the collectively measured values $y_i$ represent amounts of correction to be added to the collectively measured values $y_i$. Then, a function $\xi(\tau_i)$ indicating amounts of correction (hereinafter, "correction function") where a reference sign 33 is assigned in FIG. 8 is defined in Equation 7.

$$\xi(\tau_i) = \tau_i - y_i = \tau_i - f(a_1, a_2, \ldots, a_m, \tau_i) \quad \text{(Equation 7)}$$

(Correlation Vector)

Here, an important concept characterizing the correction function is introduced. First, discussion will be made on a measured value space having the first measured values $x_i$ in the horizontal direction and the second measured values $y_i$ in the vertical direction. Suppose that an infinite number of sample points exist in this measured value space and variances of the sample points in the x axis direction and the y axis direction, which are obtained while weighting on the sample points, are a $\sigma_{\Delta x}^2(x, y)$ and $\sigma_{\Delta y}^2(x, y)$. In this case, a point P (x, y) is the center and in a small area around a given point P (x, y), a unit vector $\gamma(x, y)$ (hereinafter, "correlation vector") representing correlativity between a measuring system where the central point P is obtained and a measuring system where near-sample points are obtained is defined in Equation 8 (shown by arrows in FIG. 9).

$$\gamma(x, y) = e^{i\theta(x,y)} \quad \text{(Equation 8)}$$

$$\theta = \tan^{-1} \frac{\sigma_{\Delta y}(x, y)}{\sigma_{\Delta x}(x, y)}$$

(Correlation Field)

Also, a vector field composed of correlation vectors $\gamma(x, y)$ defined by Equation 8 is called "correlation field".

(Correlation Lines)

Figure 9:
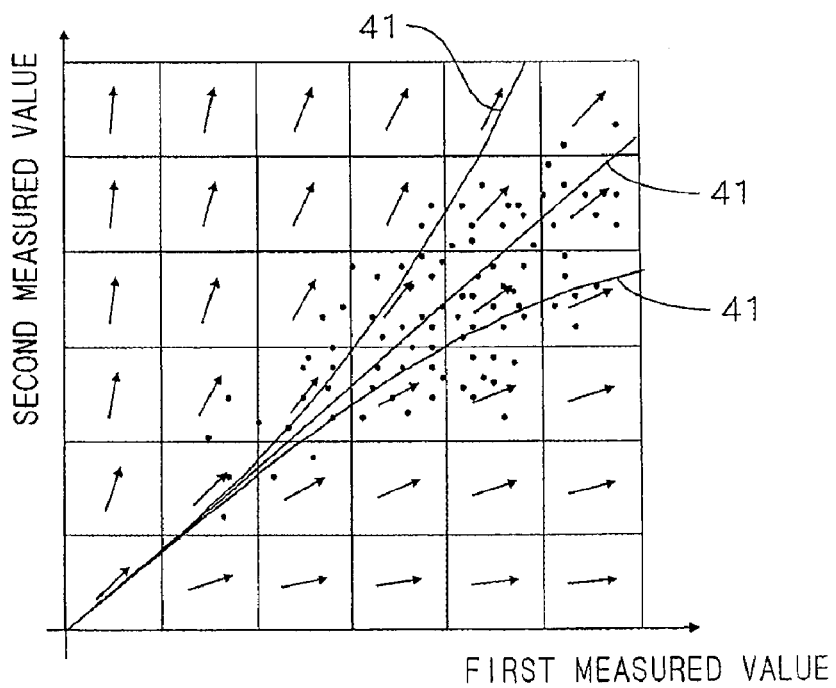
FIG. 9 is a graph showing correlation vectors and correlation lines.

In a measured value space where the correlation field is defined, lines drawn along the correlation field so that tangential directions are parallel to the correlation field are defined as "correlation lines" (in FIG. 9, reference signs 41 are assigned). Herein, the more closer given two correlation vectors $\gamma$ are, they become the same, and therefore the correlation lines do not cross each other.

(Relationship Between Correlation Lines and Transformation Function)

An infinite number of correlation lines exist in the measured value space. Among these infinite number of correlation lines, the most probable correlation line in light of all the sample points is positioned as "transformation function".

(General Process of the Black-Box Method)

Figure 10:
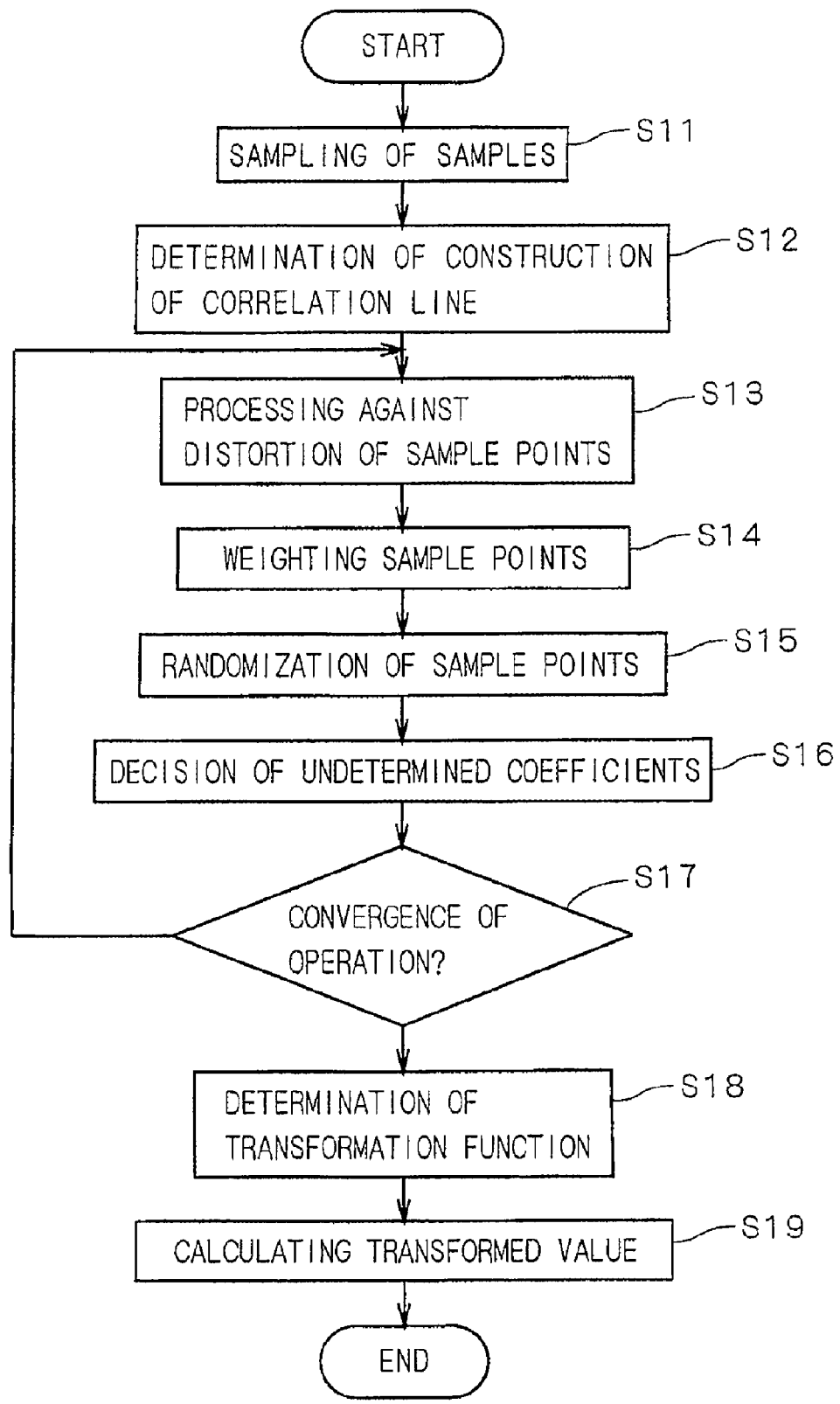
FIG. 10 is a flowchart showing a general process of the Black-Box Method.

Transformation of a measured value on the basis of the Black-Box Method resolves into matters how the transformation function is derived and how a transformed value is calculated. FIG. 10 is a flowchart showing a general process of the Black-Box Method. Hereinafter, in accordance with FIG. 10 discussion will be made on each process.

(Sampling of Samples)

With respect to the same measurand of the same measuring objects, first measured values $x_i$ and second measured values $y_i$ which are measured values in first measuring system(s) and different second measuring system(s) are sampled as samples, and sample points $P_i$ ($x_i$, $y_i$) composed of combinations of them are generated (Step S11). Since the transformation function is derived from a statistical processing of measured values, it is preferable that there are many sample points. In addition, the first measuring system(s) may be the individual measuring systems (i.e., a plurality of first measuring systems which are different from one another) or may be the collective measuring system (i.e., substantially one first measuring system), and also the second measuring system may be the individual measuring systems (i.e., a plurality of second measuring systems which are different from one another) or may be the collective measuring system (i.e., substantially one second measuring system).

(Construction of Correlation Line)

Since a difference between the correlation line and the transformation function is a set of microscopic expressions or a macroscopic expression in the same measuring space, their constructions must be the same. Then, the construction of the correlation line is set in Equation 9 as a function including an undetermined coefficient group which is at least one undetermined coefficient. Herein, $a''_j$ (j=1, 2 ... m) express undetermined coefficients of $a_j$. In this manner, by defining the correlation line as the function including the undetermined coefficients $a''_j$, it is possible to express a function group of an infinite number of functions. Also, since a difference between the transformation function shown in Equation 5 and the correlation line shown in Equation 9 is that their coefficients are the constants $a_j$ or the undetermined coefficients $a''_j$, their constructions are the same $$y = f(a_1'', a_2'', \ldots, a_m'', x) \quad \text{(Equation 9)}$$

In addition, because the correlation lines do not cross each other as discussed above, normally, undetermined coefficients of the correlation lines are in a subordinate relationship each other and the undetermined coefficients can be substantially considered as one, however, if another constraint conditions are given and under the conditions the correlation lines do not cross, the number of undetermined coefficients may be plural as in Equation 9.

(Determination of Construction of Correlation Line)

In derivation of the transformation function, first, the construction of the correlation line which is a set of the microscopic expressions is determined (Step S12). Though the construction of the correlation line is determined by referring to a scatter diagram of sample points in the measured value space or knowledge on measured values, before that, the construction must be mathematically valid. Then, discussion will be made on the requirements for the construction of the correlation line.

(Passing Origin)

Figure 1:
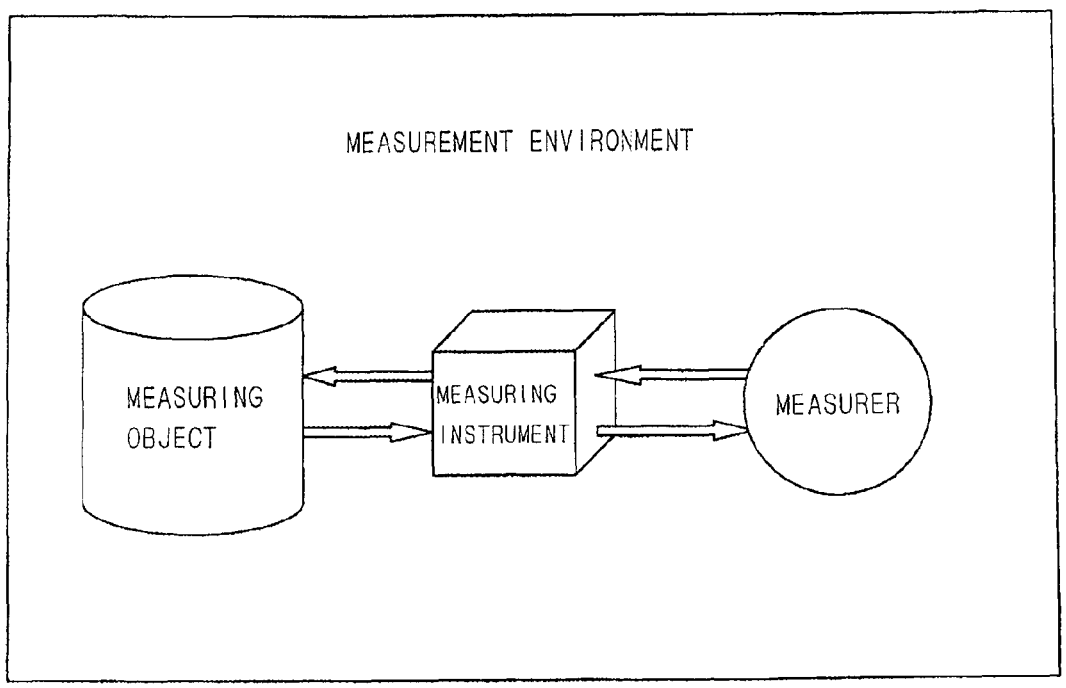
FIG. 1 is a schematic view of a measuring system.
Figure 2:
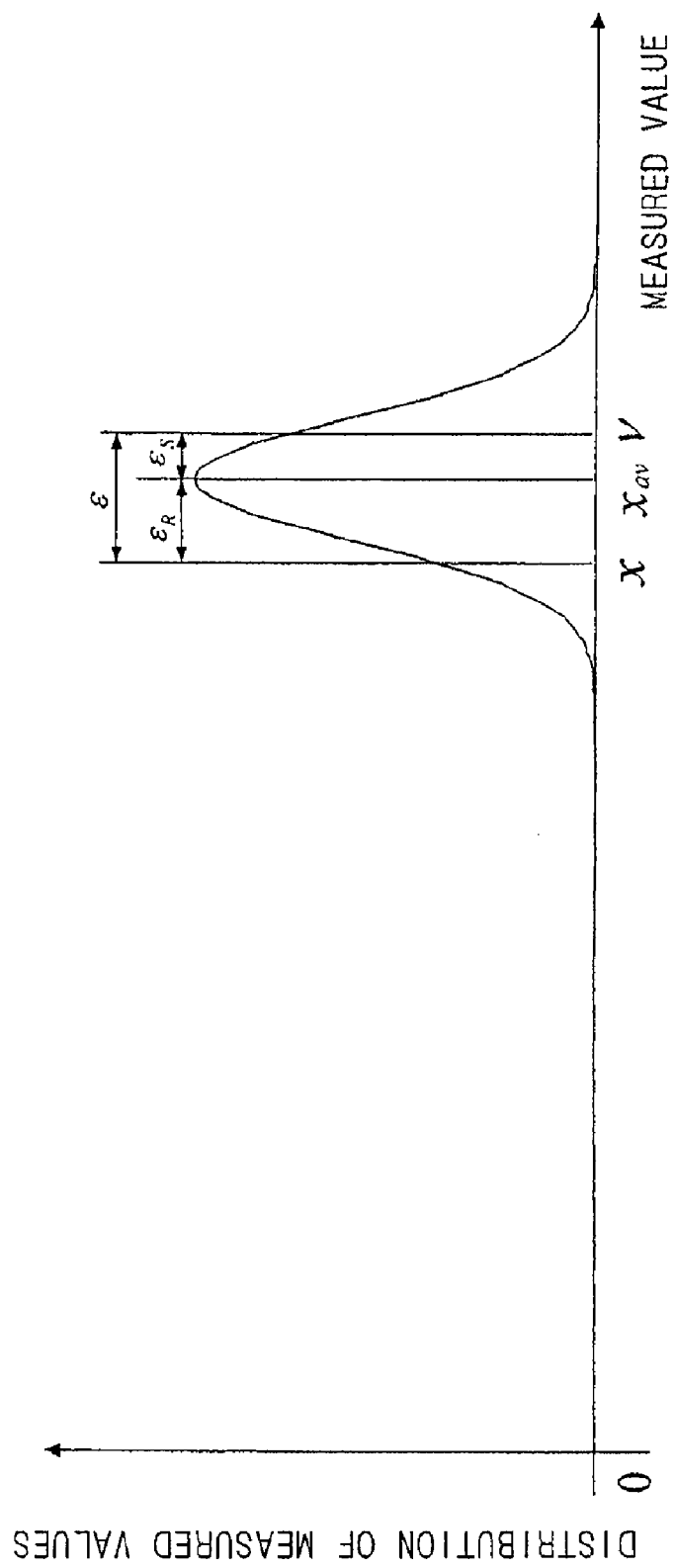
FIG. 2 is a graph showing measured values and errors.
Figure 3:
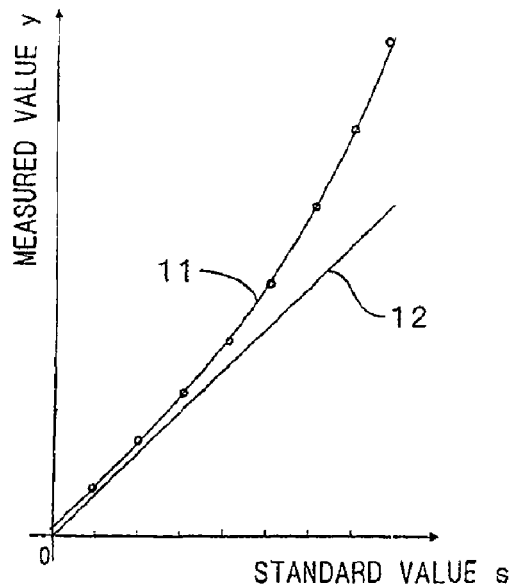
FIG. 3 is a graph showing an example of a calibration curve.
Figure 4:
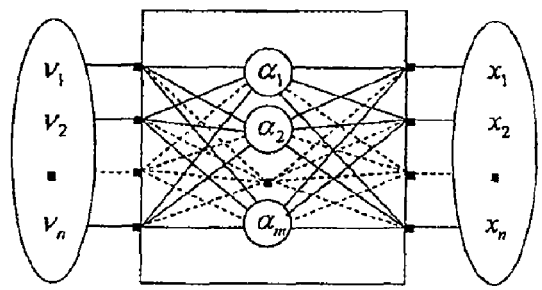
FIG. 4 is a schematic view of correction based on an analytical method.

As shown in FIG. 3, there is a case where a calibration curve 11 does not pass the origin. However, it is more reasonable that the correlation line passes the origin. Because in the Black-Box Method combinations of the measured values in the different measuring systems of the same measuring objects are set as the sample points to be processed. Though the condition of passing the origin is natural result in a case where the first measured values and the second measured values are measurement results by measuring instruments where a zero point is adjusted, such a constraint condition provides the effect of preventing the methodology from being unnecessarily complicated.

(Monotonically Increase)

Since the measured value space is a space defined relative to the same measurand of the same measuring objects, a correlation between the first measured values $x_i$ and the second measured values $y_i$ must be always positive. Therefore, the correlation line must be "monotonically increasing function". This condition ensures that between the first measured values $x_i$ and the second measured values $y_i$, if $x_i > x_k$, then $y_i > y_k$. That is, the values are not reversed in their relationship.

(Monotonically Increase or Monotonically Decrease of Correction Function)

Also, with respect to the correlation line, a function representing amounts of correction (hereinafter, "correction function $\zeta(x)$") is defined in Equation 10. Here, it is considered that amounts of correction are proportion to a size of measured values, and therefore, $\zeta(x)$ of Equation 10 which is the difference between an input value and an output value must be also "monotonically increase or monotonically decrease" relative to the input value as in $\xi(\tau_i)$ represented in Equation 7. These are the conditions for the construction of the correlation line.

$$\zeta(x) = x - f(a_1{}^u, a_2{}^u, \ldots, a_m{}^u, x) \quad \text{(Equation 10)}$$

(Processing Against Distortion of Sample Points)

By the way, all the sample points $P_i$ are not always appropriately sampled from a population, and there are some sample points including distortion. Since the distorted sample points cause distortion in the statistical processing, they are excluded from objects to be processed in advance for ensuring reliability of transformation results. As a result, only ones selected from the plurality of sample points according to a predetermined criterion are objects to be processed (Step S13).

(Weighting of Sample Points)

Also, importances of respective sample points $P_i$ are not always equal, and it is assumed there is a case where there are differences among them. Then, for reflecting importances of the sample points $P_i$ on information process, weighting of the sample points (hereinafter, "sample point weight $\omega_{Si}$") is performed (Step S14).

(Randomization of Sample Points)

For ensuring the validity in the statistical processing of the sample points $P_i$, it is a premise that they are random variables. Therefore, it is necessary to make a judgment whether the sample points $P_i$ can be used as the random variables, that is, a verification of randomization of the sample points $P_i$ should be made. Then, if the sample points $P_i$ have intentionality, processing against it is taken (Step S15). An example of process in randomization of the sample points $P_i$ will be later discussed.

(Decision of Undetermined Coefficients)

After processing against distortion, weighting and randomization are performed to the sample points $P_i$, undetermined coefficients in the correlation line are determined by the statistical processing, and then the transformation function which is a maximum likelihood correlation line is settled (Step S16). A determination method of undetermined coefficients $a''_j$ is established regardless of the number of coefficients. For example, when the correlation line includes n undetermined coefficients $a''_j$, a function of sum of squares of weighted deviations is made for sample points and correlation line thereof, and n equations are made by partially differentiating it with respective coefficients. By solving these simultaneous equations with Cramer's formula or the like, $a''_j$ are settled and the transformation function is determined. That is, a value group of the undetermined coefficient group is determined on the basis of residuals between the plurality of sample points and the correlation line and the correlation line where the value group is set is obtained as the transformation function.

(Repetitive Operations)

In addition, when the number of sample points selected in Step S13 varies according to changes of $a''_j$, the undetermined coefficients $a''_j$ of the correlation line is determined by convergence operation based on repetitive operations (Step S17).

(Determination of Transformation Function)

After the repetitive operations are complete, a function unambiguously determined by the constants $a_j$ where the undetermined coefficients $a''_j$ are set becomes "transformation function" represented in Equation 5 (Step S18).

(Calculation of Corrected Value)

A corrected value may be calculated using an inverse function of the derived transformation function. That is, corrected values $\tau_i$ corresponding to the measured values $y_i$ are obtained by Equation 11 (Step S19).

$$\tau_i = f^{-1}(a_1, a_2, \ldots, a_m, y_i) \quad \text{(Equation 11)}$$

(Example of Randomization Process of Sample Points)

Figure 11:
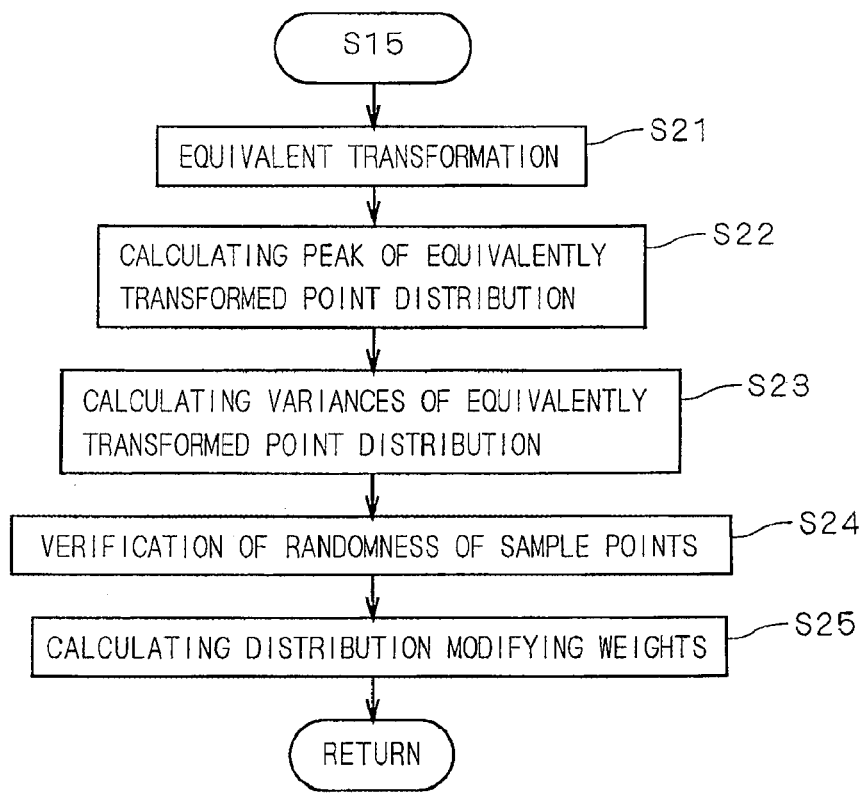
FIG. 11 is a flowchart showing an example of randomization of sample points.

FIG. 11 is a flowchart showing an example of randomization process of the sample points $P_i$ in Step S15 of FIG. 10. Hereinafter, the process will be explained along FIG. 11.

(Equivalent Transformation)

Since the correlation lines are a group of curves which do not cross from one another, there is only one correlation line which satisfies the condition of passing a given sample point $P_i(x_i, y_i)$. However, there are an infinite number of points on the correlation line passing this sample point $P_i$, and any point has a function for setting one correlation line among an infinite number of correlation lines. That is, it is considered that points on a specified correlation line have the same amount of information in a sense of specifying the correlation line. This means that if a point on a correlation line moves along the correlation line, an amount of information does not change. A process for moving the sample point $P_i$ on the correlation line on the basis of such a way of thinking is defined as "equivalent transformation".

(Degeneration of Two-dimensional Distribution into One-dimensional Distribution)

By using the way of thinking of the above equivalent transformation, it is possible to degenerate the sample points distributed two-dimensionally into a one-dimensional distribution.

Figure 12:
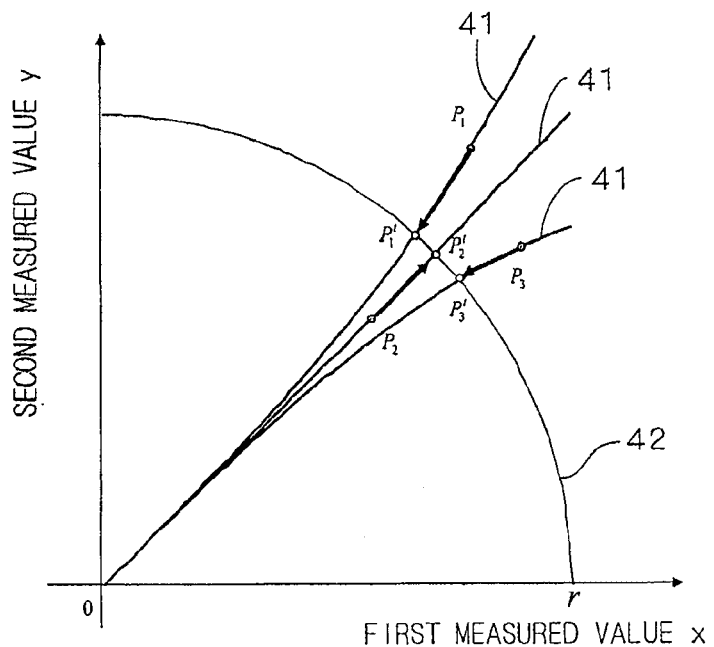
FIG. 12 is a graph showing an equivalent transformation in a first measured value-second measured value space.

First, as shown in FIG. 12, discussion will be made on an envelope 42 vertically crossing all the correlation lines 41. And a plurality of correlation lines 41 passing a plurality of sample points $P_i$ are obtained, and the sample points $P_i$ are moved to intersection points $P'_i$ (hereinafter, "equivalently transformed points") between the plurality of correlation lines 41 and the envelope (reference line) 42 along the plurality of correlation lines 41. FIG. 12 shows an example where the envelope is approximated to a circular arc having a radius r. Here, when the sample points $P_i$ ($x_i$, $y_i$) are expressed by polar coordinates as $P_i$ (r, $\theta_i$), intersection points $P'_i$ (r, $\theta'_i$) between the correlation line passing the sample points $P_i$ and the envelope are the equivalently transformed points. In the process shown in FIG. 11, first, by the above operation, a step where the sample points $P_i$ distributed two-dimensionally are degenerated into one-dimensional distribution $P'_i$ is performed (Step S21).

(Calculation of Peak of Equivalently Transformed Point Distribution)

If the sample points $P_i$ are random variables, a distribution of the equivalently transformed points $P'_i$ on the envelope 42 should be the normal distribution by the central limit theorem. For the verification, first, a peak point $P'_i$ (r, $\theta'_p$) in the distribution of the equivalently transformed points $P'_i$ (r, $\theta'_i$) on the envelope 42 is obtained (Step S22).

In this case, since the equivalently transformed points $P'_i$ are discrete values, a smoothing operation by a gaussian filter or the like is performed to them, a continuous function is formed, and then a peak value may be obtained. Also in the calculation operation of the peak point $P'_i$ of the equivalently transformed points, the sample point weights $\omega_{Si}$ of Step S14 are considered.

(Calculation of Variances of Equivalently Transformed Point Distribution)

Figure 13:
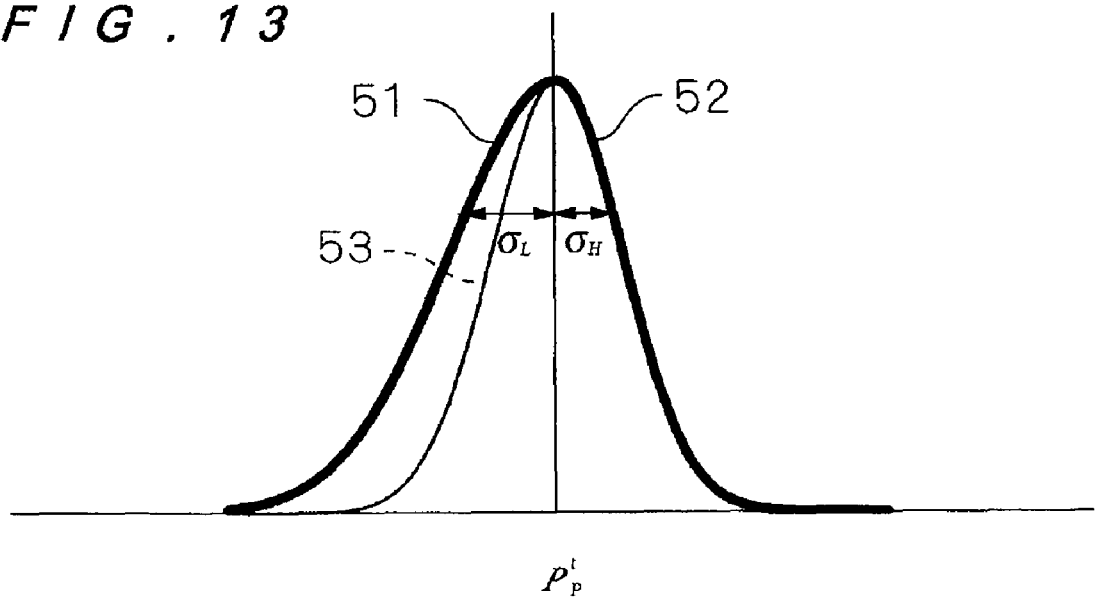
FIG. 13 is a view showing a distribution of equivalently transformed values and effect of a distribution modifying weight.

Next, the distribution is divided into an upper part and a lower part, where the peak point $P'_i$ (r, $\theta'_p$) in the distribution of the equivalently transformed points is a boundary, and a variance $\sigma_H^2$ of the upper part and $\sigma_L^2$ of the lower part are calculated in consideration of the sample point weights $\omega_{Si}$ (Step S23, see FIG. 13 ($P'_p$ refers to the peak point)).

(Verification of Randomness of Sample Points)

In the distribution of the equivalently transformed points, if $\sigma_H$ is approximately equal to $\sigma_L$, the distribution can be assumed as the normal distribution, and therefore the sample points may be dealt with as the random variables. However, if the sample points can not be dealt with as the random variables, they are not random sample points and some measures are required.

(Set of Distribution Modifying Weights)

As described below, for randomization of the sample points, weighting of producing the effect for effectively dealing with a biased distribution as the normal distribution is introduced into the sample points.

First, a standard deviation $\sigma_G$ for weighting is defined by Equation 12 by using standard deviations $\sigma_H$ and $\sigma_L$ in the distribution of the equivalently transformed points.

$$\sigma_G = \frac{\sigma_H \sigma_L}{|\sigma_H - \sigma_L|} \quad \text{(Equation 12)}$$

(Distribution Modifying Weights)

And weights (hereinafter, "distribution modifying weights") $\omega_{Di}$ of the sample points $P_i$ ($x_i$, $y_i$) are set by Equation 13. That is, weights of the plurality of sample points in the statistical processing are obtained on the basis of distribution of the plurality of moved sample points.

(Equation 13)

when $\sigma_H = \sigma_L$, (i)
$\omega_{Di} = 1$ for $\forall i$

-continued when $\sigma_H > \sigma_L$, (ii)

$$\begin{cases} \text{if } \theta'_i \leq \theta'_p \text{ then } \omega_{Di} = 1 \\ \text{if } \theta'_i > \theta'_p \text{ then } \omega_{Di} = e^{-\frac{(\theta'_i - \theta'_p)^2}{2\sigma_G^2}} \end{cases}$$

when $\sigma_H < \sigma_L$, (iii)

$$\begin{cases} \text{if } \theta'_i \geq \theta'_p \text{ then } \omega_{Di} = 1 \\ \text{if } \theta'_i < \theta'_p \text{ then } \omega_{Di} = e^{-\frac{(\theta'_i - \theta'_p)^2}{2\sigma_G^2}} \end{cases}$$

When the distribution of the equivalently transformed points $P'_i$ is asymmetrical in the upper side and the lower side of the peak point $P'_p$, the distribution modifying weights $\omega_{Di}$ are weights for processing them as numerically symmetrical distributions. By this, for example, in the case of FIG. 13, a lower distribution 51 is transformed into a distribution indicated by a broken line 53 so that a contribution degree of sample points included in the distribution 51 of the lower part and a contribution degree of sample points included in a distribution 52 of the upper part are the same.

(Applications of the Black-Box Method to Transformation of Other Measured Values)

In the above discussion, the principle of transformation of measured values based on the Black-Box Method is explained by using the example of correction of measured values, and the examples of the general process and randomization of sample points are shown.

In the Black-Box Method, by appropriately selecting first measured values $x_i$ and second measured values $y_i$, it is possible to derive a transformation function according to purpose and achieve a purposive process of measured values on the basis of the transformation function. Therefore, it can be applied to transformation of various measured values such as "standardization of measured values", "comparison of measured values", or the like. In addition, these applications of transformation of measured values will be described later.

(Characteristics of the Black-Box Method)

Analytical method is composed of analytical process based on a math model where a finite number of error factors are premises, and conversely the Black-Box Method is composed of the statistical processing based on the input-output model where existence of an infinite number of error factors is a premise. From another viewpoint, the analytical method is symbolic approach where an error is explained as effect of error factors, and conversely the Black-Box Method can be positioned as exclusive approach where intervention of symbols is not required for explanation of causal relationship. In the Black-Box Method, since symbols are excluded in transformation of measured values, errors in symbolization do not occur and therefore it is possible to achieve information process ensuring the quantitativeness.

The Black-Box Method is "methodology for functioning in all the measuring systems, where a special instrument or the like is not needed and systematic errors which derive from all the constituent elements in the measuring systems are subjects to ensure validity in a transformation result". In addition to this function, since the Black-Box Method is "simple and useful methodology with versatility", it can be positioned as "general method for transformation of measured values".

As specific applications of the Black-Box Method, first, "standardization of records of marathon" is explained in detail, and thereafter as other applications, "evaluation of records of competing race", "correction of fuel consumption of car", "correction of scores of selected examination subject", "calculation of consumer price", and "evaluation of medical act and the like" will be described. Though these applications objectively support wide range of industrial usage of the Black-Box Method, they include individually specific problems which are not referred in the above-discussed general process of the Black-Box Method, and it is considered that they are significant cases in a sense of clearly specifying methods of response to them.

(Problems in Transformation of Records of Marathon)

In a race of long race time such as marathon which is long-distance running, the records are greatly affected by environmental factors like weather conditions such as temperature, humidity, wind and the like or course conditions such as height difference of course, ground state and the like. Therefore, when representatives of the Olympic Games or world championship are selected from a plurality of races, if records are not evaluated in consideration of differences among respective race conditions, significant unfairness occurs. However, in the present circumstances, since there is no reasonable methodology for evaluation of records, we have to perform selection depending on records or positions in races, or professional knowledges. From this background, it can be said that methodology for fairly evaluating records of marathon is a matter which is to be settled urgently.

(Characteristics of Data on Marathon)

As characteristics of data on marathon, first, it should be recognized that there is a case where artificial distortion is included in data because of the peculiarity of race or holding conditions. For example, when checkpoints must be provided for limitation of race management, some of entry runners are forced to drop out of the race (DNF) even if they have will and ability to finish the race, because they cannot pass through a checkpoint, and consequently a part of data is unnaturally missed.

Also, the data have a characteristic because of the data concerning living bodies. That is, in movement of living body, physiological phenomena such as depletion of energy, decrease of movement efficiency, and the like occur according to passage of time by unique energy metabolism mechanism of living body. Therefore, movement of living body can not be dealt with on the basis of a mechanical mechanism such as a car.

Furthermore, it should be considered that marathon is the act of humans which are intelligent creatures. In other words, it should be considered that a human continuously has conflict for the record, for example, a human lose concentration if a good record or victory can not be expected or the like, instead of exercising depending on biological mechanism like low creatures.

Though in processing of data of marathon there are special matters shown above, if these matters can be appropriately processed, data of marathon can be basically dealt with in the above-described general process.

(Corresponding Relationship Between General Process and Case of Marathon)

In the Black-Box Method, first, discussion will be made on a corresponding relationship between the general process for transformation of measured values and a specific example of processing records of marathon.

(Actual Race Time and Personal Best Time)

Now, a marathon race where $N_p$ runners participated and $N_f$ runners finished (hereinafter, "target race") is assumed. In this case, a population of data is all entry runners of the target race, "records of marathon in other races which the entry runners of the target race have" correspond to first measured values $x_i$ and "finish times in the target race" (hereinafter, "actual race time") correspond to second measured values $y_i$.

(Entry Qualifying Time)

In the meantime, "entry qualifying time" is required for qualification in many marathon races. It is generally the best record which satisfies the condition where it is obtained in an official race within two years from the target race. These entry qualifying times not only reflect abilities of entry runners but also have various measuring systems (conditions of races where the entry runners obtained entry qualifications). As such, since the entry qualifying times satisfy the requirement for the individually measured values and acquisition of the data is easy, entry qualifying times (hereinafter, "personal best times") in the target race are used for the first measured values $x_i$ for correction of records of marathon.

(Sampling of Samples)

From the above discussion, samples used for transformation of records of marathon are personal best times (entry qualifying times in the target race) $x_i$ and actual race times (finish times in the target race) $y_i$, and combinations of these samples are sample points $P_i$ ($x_i$, $y_i$) (FIG. 10: Step S11).

(Actual Race Condition and Personal Best Time Condition)

Since an error derived from a measuring instrument or a measurer in a record of marathon is a few seconds at most and it is very small in comparison with race time longer than 2 hours, it may be considered that most of the error in the record of marathon derives from differences in race conditions. In other words, in transformation of records of marathon, it is enough that race conditions are considered as error factors of measuring systems. Herein, a race condition where actual race times are obtained (a second measuring system which is the collective measuring system) is called "actual race condition", and race conditions where personal best times are obtained ((a plurality of) first measuring systems which are the individual measuring systems) are called "personal best time conditions".

(Standardization and Standardized Value of Record of Marathon)

If entry runners increase, races where personal best times are obtained by respective entry runners are dispersed. Therefore, it is assumed that the personal best time condition which is virtually constructed by a statistical processing of the personal best times is almost uniform. However, since the personal best time is a personal best record within two years before the target race, it is thought that the race condition was good. As such, it is considered that the personal best time condition is a better condition than a standard race condition, and therefore it can be regarded as a standardized measuring system (hereinafter, "standardized system S'' ") which is a kind of "quasi-standard system S' " (first reconstituted system). In other words, when the personal best times $x_i$ and the actual race times $y_i$ are used as samples, an entity of the process is "standardization of records of marathon", and transformed values $\tau_i$ of the actual race times $y_i$ into records under the personal best time condition are positioned as "standardized values".

(Distribution of Sample Points in Personal Best Time-actual Race Time Space)

Figure 14:
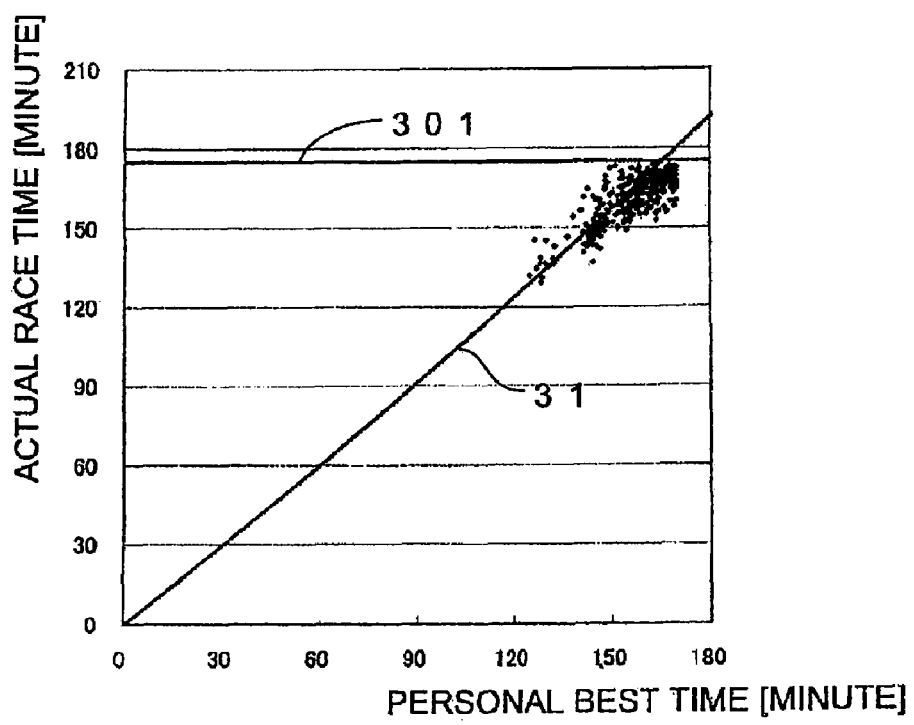
FIG. 14 is a graph showing a distribution of sample points in a personal best time-actual race time space.

FIG. 14 is a scatter diagram showing the results of Fukuoka International Marathon in 2004 in a personal best time-actual race time space. As shown in FIG. 14, there is a strong correlation between the personal best times $x_i$ and the actual race times $y_i$. Basically, in the personal best time-actual race time space, it is enough to obtain a transformation function 31 which connects the actual race times and the personal best times by the statistical processing of the sample points.

(Distortion of Sample Points by Time Limit Line)

In the meantime, in the scatter diagram shown in FIG. 14, part of the distribution of the sample points is deleted. A straight line 301 horizontally crossing an upper part of FIG. 14 is a line representing a checkpoint set by race regulations (hereinafter, "time limit line") and it is expressed in Equation 14. Herein, $y_{max}$ is the record of the slowest runner in finished runners.

$$y = y_{max} \quad \text{(Equation 14)}$$

As clearly shown in FIG. 14, many runners forced to retire from the race because of time limit are included in entry runners, even though they have will and ability to finish the race. Therefore, if the statistical processing of the sample points is performed in a state where such a distortion of the distribution is kept, it is obvious that distortion occurs in the result of the process, and accordingly, before the processing, distorted sample points are excluded from objects to be processed, and only the rest selected sample points are objects of the statistical processing.

(Determination of Construction of Correlation Line)

A construction of a correlation line must be valid in light of properties of a case. However, it is not easy to determine it. Then, a construction of the correlation line ensuring the validity is determined through the following steps.

(Performance Ratio)

First, by using the personal best times $x_i$ and the actual race times $y_i$, indices $\eta_i$ (hereinafter, "performance ratios") expressing performance of individuals are defined in Equation 15.

$$\eta_i = \frac{x_i}{y_i} \quad \text{(Equation 15)}$$

(Rate Function)

In addition, as Equation 15, a function of defining proportions $\eta_i$ ($=x_i/y_i$) between the first measured values $x_i$ and the second measured values $y_i$ is called "rate function".

(Distribution of Sample Points in Personal Best Time-performance Ratio Space)

Figure 15:
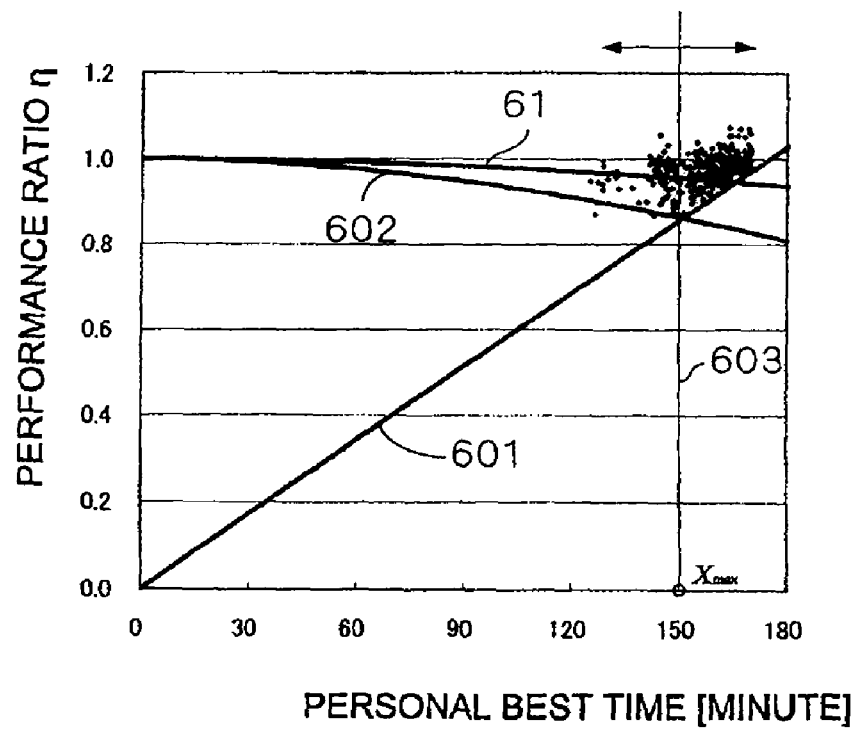
FIG. 15 is a graph showing a distribution of the sample points in a personal best time-performance ratio space.

FIG. 15 shows the same sample points as those shown in FIG. 14 in a personal best time-performance ratio space. In this space, the above time limit line (a reference sign 601 is assigned) is expressed in Equation 16.

$$\eta = \frac{x}{y_{max}} \quad \text{(Equation 16)}$$

(Performance-ratio Function)

First, a function expressing a relationship between the personal best time and the performance ratio is defined as Equation 17, and it is called "performance-ratio function". The performance-ratio function can be positioned as a correlation line expressing the relationship between the personal best time and the performance ratio.

$$\eta = g(x) \quad \text{(Equation 17)}$$

(Mathematical Requirements of Performance-ratio Function)

Mathematical requirements of the performance-ratio function are as follows. First, Equation 18 is satisfied in accordance with the definition of Equation 15.

$$g(x) > 0 \quad \text{(Equation 18)}$$

And Equation 19 is satisfied from a requirement of convergence in a case where x is infinite.

$$g(\infty) = 0, 1 \text{ or } \infty \quad \text{(Equation 19)}$$

Also, if race time is short, records are not affected by environment, and therefore it is preferable that Equation 20 is also satisfied.

$$g(0) = 1 \quad \text{(Equation 20)}$$

Further, Equation 21 needs to be satisfied since it is required that the performance ratio gently varies around x=0.

$$\left. \frac{\partial g(x)}{\partial x} \right|_{x=0} = 0 \quad \text{(Equation 21)}$$

Additionally, since the personal best time and the performance ratio should correspond almost linearly, it is needed that they monotonically increase or monotonically decrease. Thus, Equation 22 is satisfied in a definition area.

$$\frac{\partial g(x)}{\partial x} \geq 0 \text{ or } \frac{\partial g(x)}{\partial x} < 0 \text{ for } \forall x \quad \text{(Equation 22)}$$

(Construction of Performance-ratio Function)

Various performance-ratio functions (correlation lines) can be proposed which are functions satisfying all the above five requirements and includes an undetermined coefficient group which is at least one undetermined coefficient, and for example, a function ($a^u_j$, $A^u_j$ are unknown coefficients) expressed in Equation 23 can be shown, however as discussed above, when the unknown coefficients are plural, it is needed that the unknown coefficients are made in a subordinate relationship one another and another constraint condition is given for performing the equivalent transformation, therefore herein, a function expressed in Equation 24 is set (Step S12). When randomization accompanying the equivalent transformation is not performed, the performance-ratio function may include a plurality of independent undetermined coefficients.

$$\eta = \frac{1}{A^u_1 + A^u_2 + \ldots + A^u_m} \left( A^u_1 e^{a^u_1 x^2} + A^u_2 e^{a^u_2 x^2} + \ldots + A^u_m e^{a^u_m x^2} \right) \quad \text{(Equation 23)}$$

$$\eta = e^{a^u x^2} \, (a^u : \text{real number}) \quad \text{(Equation 24)}$$

(Environment Index)

The undetermined coefficient $a^u$ in Equation 24 is a value for quantitatively defining the actual race condition in the target race, and it is called "environment index". A relationship between the environment index au and the race condition is shown in Table 2.

TABLE 2

| Environment Index | Race Condition (One side larger than the other side is good condition) |
|---|---|
| $a^u > 0$ | Actual Race Condition > Personal Best Time Condition |
| $a^u = 0$ | Actual Race Condition = Personal Best Time Condition |
| $a^u < 0$ | Actual Race Condition < Personal Best Time Condition |

(Correlation Line Derived Through Performance-ratio Function)

Performance ratios $\eta_i$ are proportions between the personal best times $x_i$ and the actual race times $y_i$, and they are generally expressed as Equation 25.

$$\eta = \frac{y}{x} \quad \text{(Equation 25)}$$

Therefore, Equation 26 is obtained from Equation 24 and Equation 25.

$$y = \frac{x}{e^{a^u x^2}} \quad \text{(Equation 26)}$$

Equation 26 is the construction of the correlation line derived (i.e., changed) through the performance-ratio function (generally, rate function). By the method deriving the correlation line in accordance with such process, the correlation line extends almost horizontally and the construction of the correlation line can be easy to understand intuitively.

(Practicality of Correlation Line)

In the meantime, the function expressed in Equation 26 is not the monotonically increasing function when $a''>0$, and it does not satisfy the above described mathematical requirement. However, a coefficient a in the transformation function is normally a negative value, and if it is positive, it is an extremely small value. Also, since it is the monotonically increasing function in Equation 27, there are no practical problems in a use of standardization of records of marathon.

$$x < \frac{1}{\sqrt{2a^u}} \quad \text{(Equation 27)}$$

(Standard Performance-ratio Function)

Among the performance-ratio functions, a function $\eta_0$ determined by the statistical processing of the sample points and representing a standard performance ratio in light of the sample points is defined and it is called "standard performance-ratio function". The standard performance-ratio function $\eta_0$ is a transformation function which connects a corrected time $\tau$ and the standard performance ratio and it is expressed in Equation 28. Also, the standard performance-ratio function is a function indirectly representing a relationship between a first reconstituted system (a reconstituted system derived from a plurality of personal best time conditions (the individual measuring system)) and a second reconstituted system (since the actual race condition is the collective measuring system, it is the same as the second measuring system).

$$\eta_0 = e^{a\tau^2} \text{ (a: real number)} \quad \text{(Equation 28)}$$

(Standard Environment Index)

The coefficient a in Equation 28 is the environment index (i.e., value determined with respect to the undetermined coefficient $a''$) when the performance-ratio function $\eta$ is the standard performance-ratio function $\eta_0$, and this is called "standard environment index".

(Derivation Process of Standard Environment Index)

A standard environment index a is generally obtained from the statistical processing of the sample points in the personal best time-actual race time space, however, it can be easily calculated when it is obtained from a process in the personal best time-performance ratio space, and therefore the latter case is described as follows. In addition, to obtain the standard environment index a in the personal best time-actual race time space, that is, to obtain the transformation function and to obtain the standard environment index a in the personal best time-performance ratio space are practically equivalent.

(Preparation Process)

Figure 17:
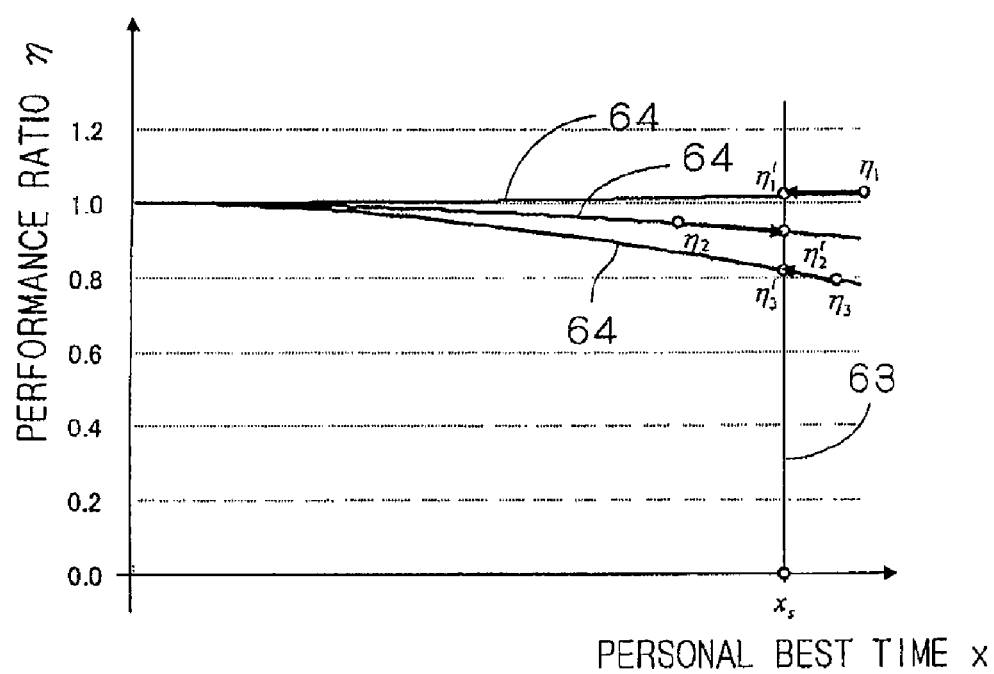
FIG. 17 is a graph showing an equivalent transformation in a personal best time-performance ratio space.

In obtaining the standard environment index a, first, the equivalent transformation is performed on all the sample points as a preparation process. Though the equivalent transformation in the personal best time-performance ratio space will be later discussed in detail referring to FIG. 17, if the summary is explained, a transformation reference value $x_s$ is appropriately determined as shown in FIG. 17, and sample points are moved onto a straight line $x = x_s$ (hereinafter, "transformation reference line") 63 along correlation lines 64 where coefficients a are determined so that the correlation lines 64 pass through the respective sample points. Then, a variance $\sigma_H$ of an upper part and a variance $\sigma_L$ of a lower part with respect to a peak of distribution of the sample points on the straight line 63 are obtained to prepare them. The initial values of the variances $\sigma_H$, $\sigma_L$ may be set by a user appropriately.

(Process Against Distortion of Sample Points)

The time limit line 601 shown in FIG. 15 occurs due to an artificial factor, if the process is performed in a state where data distorted by such artificial effects are kept, reliability of the result is reduced. Therefore, before the process, distorted part in distribution of sample points $P_i$ is excluded according to the following method (Step S13).

First, a random value is set as the initial value of the environment index $a^u$ in the performance-ratio function $\eta$. Next, a line (a reference sign 602 is assigned in FIG. 15, and hereinafter, "data assurance line") assuring an existence range of sample points used in determining Equation 28 is defined in accordance with Equation 29.

$$\eta_L = e^{a_L^u x^2} \quad \text{(Equation 29)}$$

Herein, $\eta_L$ expresses an existence assuring range of performance-ratio distribution. A coefficient $a_L$ of a data assurance line $\eta_L$ is obtained by Equation 30 with the standard deviation $\sigma_H$ obtained in the above-discussed preparation operation. Naturally, $a_L$ may be obtained by other computations.

$$a_L = \frac{\ln(e^{a^u x_s^2} - 2\sigma_H)}{x_s^2} \quad \text{(Equation 30)}$$

An intersection point $x_{max}$ (hereinafter, "sample separating value") between the defined data assurance line 602 and the time limit line 601 is obtained, sample points where $x_i \leq x_{max}$ (that is, sample points exist in a left side of a straight line 603 in FIG. 15) are defined as effective sample points which are selected as objects of the statistical processing. Using Equation 30 ensures existence of sample points without distortion of a little over 95%.

(Weighting of Sample Points)

It is rather unfair that all data of runners having different race abilities are processed equivalently. Therefore, the sample points are weighted according to the race abilities of the entry runners, that is, the personal best time x. As a result of hearing investigation of a plurality of runners, it turned out that a relationship shown in Equation 31 is approximately constructed between the personal best time x of marathon and a monthly average running distance L. Herein, it is thought that an index n is a value almost in a range from 3.5 to 4.0.

$$L = \frac{k}{x^n} \text{ (k, n are positive real numbers)} \quad \text{(Equation 31)}$$

Figure 16:
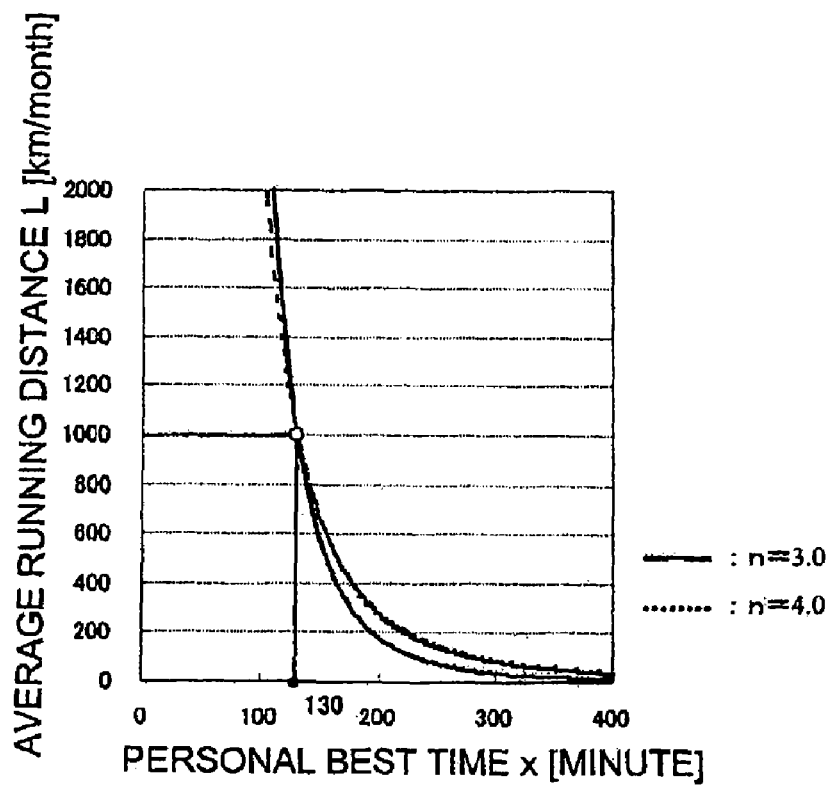
FIG. 16 is a graph showing a relationship between a record of marathon and a monthly average running distance.

FIG. 16 shows an example of the relationship between the monthly average running distance and the personal best time of male runners. Herein, a monthly average running distance of a runner having a personal best time of 2 hours and 10 minutes is represented as 1000 km/month. From FIG. 16, it can be said that "runners having good personal best times have long monthly average running distances". Also, since it is assumed that "runners with a larger amount of training have high stability and reliability of race result", it can be said that "race results of runners having good personal best times are highly stable and reliable". In consideration of the above discussion, sample point weights $\omega_{Si}$ are defined by Equation 32 (Step S14). Since only proportion of the sample point weights $\omega_{Si}$ has significance, a coefficient k of Equation 32 may be anything which is a positive real number.

$$\omega_{Si} = \frac{k}{x_i^n} \quad \text{(Equation 32)}$$

(Randomization of Sample Points)

Randomization of the samples is also performed in the personal best time-performance ratio space shown in FIG. 17 for easy process (Step S15). First, since the correlation lines 64 are almost in parallel with the x axis, an envelope of the correlation lines 64 is approximated to the transformation reference line 63 which is a line vertical to the x axis. Next, correlation lines 64 passing through the sample points to be processed are obtained, and the respective sample points are moved onto the transformation reference line 63 along the correlation lines 64 (Step S21). Then, a value $\eta^t_p$ which is a peak in distribution of equivalently transformed points $\eta^t_i$ which are points after movement is obtained, and as in the above-discussed preparation process, a variance $\sigma_H^2$ of the upper part and $\sigma_L^2$ of the lower part in the distribution where $\eta^t_p$ is a boundary are individually calculated (Steps S22, S23).

In the case of samples of marathon, the distribution of the equivalently transformed points $\eta^t_i$ (hereinafter, "reference performance ratios") on the transformation reference line 63 unexceptionally satisfies $\sigma_H < \sigma_L$ (Step S24). The reason is assumed that there are many runners in bad physical condition in the target race, compared to races where personal best times are obtained. Since matters of individual conditioning correspond to intentional reasons, contribution degrees of runners having low performance ratio need to be decreased in the statistical processing. Then, distribution modifying weights $\omega_{Di}$ for randomization of the reference performance ratios $\eta^t_i$ are set by Equation 33 on the basis of Equation 13 (Step S25). Specifically, (a part of) weights of a plurality of sample points in the statistical processing are obtained on the basis of the distribution of the plurality of sample points on the transformation reference line 63.

$$\begin{cases} \text{if } \eta^t_i \geq \eta^t_p \text{ then } \omega_{Di} = 1 \\ \text{if } \eta^t_i < \eta^t_p \text{ then } \omega_{Di} = e^{-\frac{(\eta^t_i - \eta^t_p)^2}{2\sigma_G^2}} \end{cases} \quad \text{(Equation 33)}$$

By introducing the distribution modifying weights $\omega_{Di}$, influence of runners who did not finish (DNF) upon result of the statistical processing is made 0. In other words, instead of excluding results of runners who did not finish and runners who collapsed from objects to be processed as excluded values, these sample points can be incorporated into a framework of the basic statistical processing.

(Statistical Processing of Sample Points)

In consideration of the above process, decision of the standard environment index a in the performance-ratio function is performed. First, differences $\delta_i$ between the sample points and the performance-ratio function where a provisional value of the environment index $a^u$ is set are expressed in Equation 34.

$$\delta_i = \eta_i - e^{a^u x_i^2} \quad \text{(Equation 34)}$$

Therefore, differences $\delta_{\omega i}$ considering personal best time weights $\omega_{Si}$ and distribution modifying weights $\omega_{Di}$ are expressed in Equation 35, and a function of sum of squares of weighted deviations $\xi$ is obtained by Equation 36.

$$\delta_{\omega i} = \omega_{Si} \omega_{Di} (\eta_i - e^{a^u x_i^2}) \quad \text{(Equation 35)}$$

$$\xi = \Sigma \delta_{\omega i}^2 = \Sigma \omega_{Si}^2 \omega_{Di}^2 (\eta_i - e^{a^u x^2})^2 \quad \text{(Equation 36)}$$

Equation 36 is partially differentiated by $a^u$ and it is settled as 0 as shown in Equation 37, and then this is rearranged to become Equation 38.

$$\frac{\partial \xi}{\partial a} = -2 \sum \omega_{Si}^2 \omega_{Di}^2 x_i^2 (\eta_i - e^{a^u x_i^2}) = 0 \quad \text{(Equation 37)}$$

$$\sum \omega_{Si}^2 \omega_{Di}^2 x_i^2 \eta_i = \sum \omega_{Si}^2 \omega_{Di}^2 x_i^2 e^{a^u x_i^2} \quad \text{(Equation 38)}$$

Left-hand side of Equation 38 is a constant value, and a value of right-hand side monotonically increases relative to $a^u$. A value of $a^u$ satisfying Equation 38 is therefore unambiguously determined. This is the standard environment index a (Step S16). As discussed above, a value group of the undetermined coefficient group (environment indices) is determined on the basis of differences between the plurality of sample points and the correlation line, and the correlation line where the value group is set is obtained as the transformation function (standard performance-ratio function).

(Repetitive Operations)

In a case where distortion is included in sample values as in data of marathon, the number of sample points to be processed varies according to the environment index $a^u$ in the process of measures against distortion. Therefore, a computation for obtaining the standard environment index a is made repetitive operations, and a value when $a^u$ converges is determined as the standard environment index a (Steps S17, S18).

(Calculation of Corrected Time)

After a standard performance-ratio index a is determined, a transformation function which connects an actual race time y and a corrected time τ is defined as Equation 39, and the corrected time τ can be obtained by solving Equation 39 with respect to τ (Step S19).

$$y = \frac{\tau}{e^{a\tau^2}} \quad \text{(Equation 39)}$$

(Newton Method)

However, since it is not possible to solve Equation 39 analytically with respect to τ, it is numerically solved by convergence operation using the Newton method. First, a function f (τ) is defined by Equation 40 and f (τ) can be differentiated at any position as expressed in Equation 41.

$$f(\tau) = \frac{\tau}{e^{a\tau^2}} - y \quad \text{(Equation 40)}$$

$$f'(\tau) = \frac{1 - 2a\tau^2}{e^{a\tau^2}} \quad \text{(Equation 41)}$$

A tangential line in a point $(\tau_j, y_j)$ on the f (τ) is expressed in Equation 42, and intercept $\tau_{j+1}$ of Equation 42 is expressed in Equation 43.

$$y - y_j = \frac{1 - 2a\tau_j^2}{e^{a\tau_j^2}}(\tau - \tau_j) \quad \text{(Equation 42)}$$

$$\tau_{j+1} = -\frac{y_j e^{a\tau_j^2}}{1 - 2a\tau_j^2} + \tau_j \quad \text{(Equation 43)}$$

However, since Equation 44 is the premise, Equation 43 becomes Equation 45.

$$y_j = \frac{\tau_j}{e^{a\tau_j^2}} - y \quad \text{(Equation 44)}$$

$$\tau_{j+1} = \frac{y e^{a\tau_j^2} - \tau_j}{1 - 2a\tau_j^2} + \tau_j \quad \text{(Equation 45)}$$

As such, a corrected time $\tau_i$ where the actual race time is $y_i$ can be obtained by the convergence operation based on the recurrence formula expressed in Equation 45.

(Standardization Algorithm of Records of Marathon)

Figure 18:
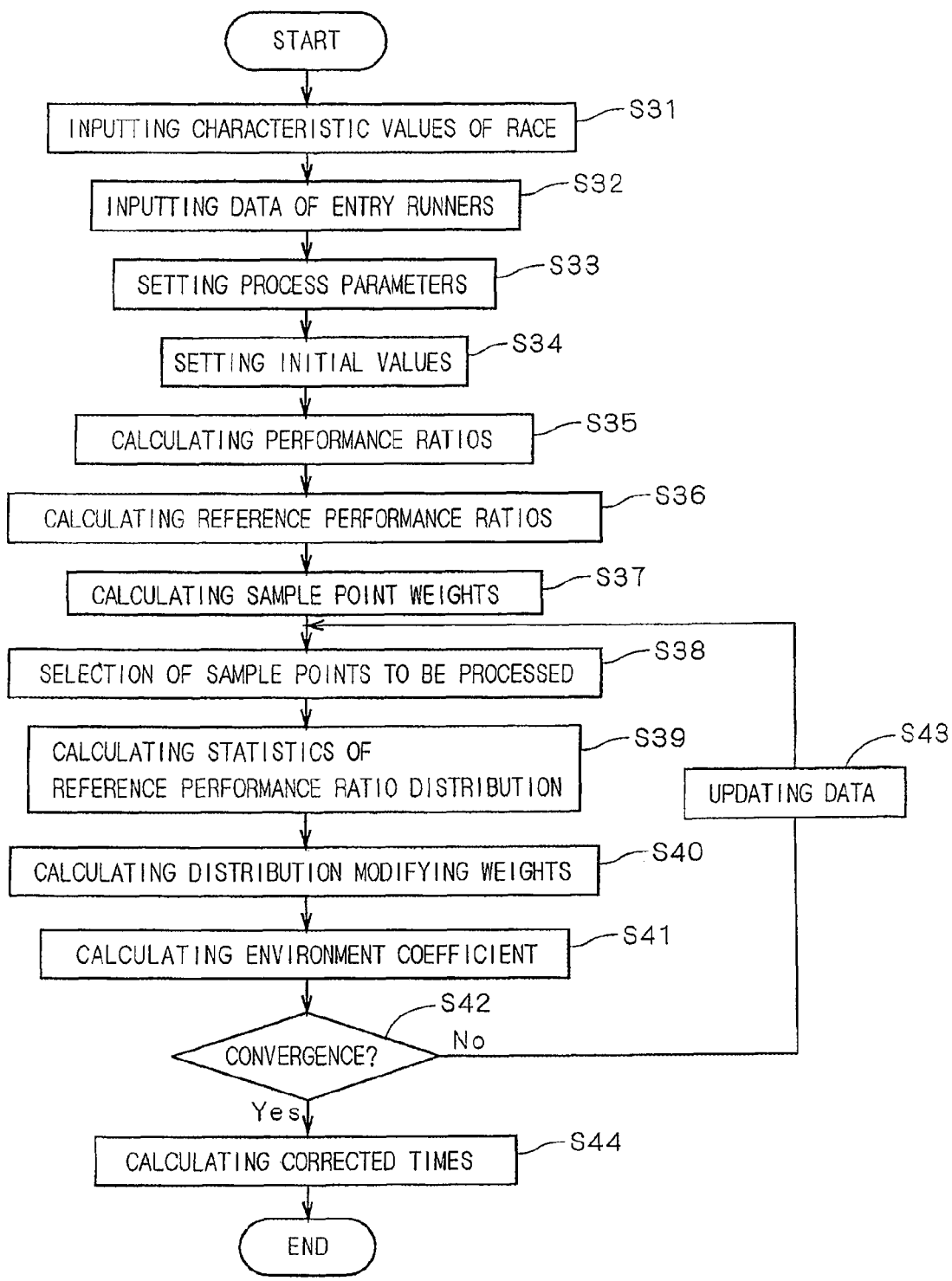
FIG. 18 is a flowchart showing a flow of standardization of records of marathon.

FIG. 18 is a flowchart showing the above-discussed process of standardization of the records of marathon with specific operations of marathon. This process is a convergence operation composed of multiple loops, and the flow will be described briefly as follows. Herein, in FIG. 10, the weighting process of sample points is included in the repetitive operations, however, weights may be obtained once in the standardization of records of marathon and in actual operations shown in FIG. 18, weighting of sample points is performed before the repetitive processes. Furthermore, in the above description of standardization of the records of marathon, the equivalent transformation is referred in the randomization of sample points, however, the equivalent transformation may be performed once when the transformation reference line $x=x_s$ is not changed and calculation of the reference performance ratios by the equivalent transformation is also performed before the repetitive processes in actual operations shown in FIG. 18. And in the following description, reference signs of corresponding steps in FIG. 10 and FIG. 11 are also assigned.

Inputting Characteristic Values of Race (Step S31)

Ones which are characteristic values of a race to be processed and relate to the process are inputted to a measured value transformation system which is a computer. Specifically, the characteristic values are the number of entry runners $N_p$, the number of finished runners $N_f$, a final finish time $y_{max}$, and the like.

Inputting Data of Entry Runners (Steps S32, S11)

Personal best times $x_i$ of $N_p$ runners who took part in the race and actual race times $y_i$ of finished runners are inputted to an operation apparatus. Also, sampling of sample points $P_i$ $(x_i, y_i)$ is also performed.

Setting Process Parameters (Steps S33, S12)

In the algorithm, some parameters need to be set in advance. Specifically, they are a construction of a correlation line (transformation function) including an undetermined coefficient group, a transformation reference value $x_s$, an index n for determining sample point weights $\omega_{Si}$ of Equation 32, a coefficient $\sigma_F$ accompanying a smoothing filter for forming a continuous function from equivalently transformed points, and the like. Some of them are construction and parameters which can be determined by scholarly knowledge, and however, some are those determined by practical requests.

Setting Initial Values (Step S34)

Initial values required for start of the operation are set. Values requiring the initial values are an environment coefficient a, standard deviations $\sigma_H$ and $\sigma_L$ in distribution of reference performance ratios $\eta^t_i$, and the like. The initial values may be anything that are adapted to processing loop.

Calculating Performance Ratios (Step S35)

With respect to effective sample points $P_i$ $(x_i, y_i)$, performance ratios $\eta_i$ are calculated by the measured value transformation system on the basis of Equation 15. With this operation, each of a plurality of actual race times (second measured values) is replaced with a proportion between a personal best time (first measured value) and an actual race time (second measured value) of a corresponding entrant (measuring object).

Calculating Reference Performance Ratios (Steps S36, S21)

The equivalent transformation is performed to transform sample points distributed in a two-dimensional space into a one-dimensional space, and a reference performance ratios $\eta^t_i$ are obtained. Since ones substituting $x_i$ into Equation 24 are performance-ratio functions $\eta_i$ and ones substituting $x_s$ are $\eta^t_i$, the reference performance ratios $\eta^t_i$ are obtained by Equation 46.

$$\eta^t_i = e^{\ln \eta_i \left(\frac{x_s}{x_i}\right)^2} \quad \text{(Equation 46)}$$

Calculating Sample Point Weights $\omega_{Si}$ (Steps S37, S14)

Sample point weights $\omega_{Si}$ are obtained on the basis of Equation 32.

Limiting Sample Points to be Processed (Steps S38, S13)

A sample separating value $x_{max}$ is obtained from an intersection point between the data assurance line 602 and the time limit line 601 shown in FIG. 15, and sample points satisfying $x_i < x_{max}$ are selected as objects to be processed, whereby performing measures against distortion of sample points.

Calculating Statistic Values of Transformed Points (Steps S39, S22, S23)

With respect to process data limited by the above method, that is, all limited sample points, statistic values of distribution of the reference performance ratios $\eta^t_i$, a peak $\eta^t_p$ of the distribution, and variances $\sigma_H$, $\sigma_L$ of the upper part and the lower part are calculated. In FIG. 15, a performance-ratio function 61 passing through the peak is shown for reference.

Calculating Distribution Modifying Weights $\omega_{Di}$ (Steps S40, S25)

Distribution modifying weights $\omega_{Di}$ are calculated on the basis of Equation 33.

Calculating Environment Index (Steps S41, S16)

A value of an environment index $a''$ is calculated on the basis of differences between the plurality of sample points and the correlation line so that a correlation between the personal best time x and the corrected time $\tau$ is maximum. A function of sum of squares of weighted errors is used for evaluation of the correlation.

Judging Convergence (Steps S42, S17, S18)

The environment index $a''$ which is the basis of calculation and an environment index $a'''$ which is newly obtained are compared, and if $a''=a'''$, the computation is complete. A convergence value of $a''$ is made a standard environment coefficient a.

Updating Data in Repetitive Operations (Step S43)

If a difference between the environment indices $a''$ and $a'''$ is equal to or greater than a predetermined value, the value of $a''$ is updated to $a'''$, and Step S38 to Step S42 are repeated.

Calculating Corrected Times (Steps S44, S19)

Corrected times $\tau_i$ corresponding to the actual race times $y_i$ are obtained from a transformation function derived from the obtained standard environment coefficient a. However, since it is not possible to analytically obtain an inverse function with respect to $\tau$ in Equation 39, it is numerically solved using the convergence operation by the recurrence formula based on the Newton method expressed in Equation 45.

(Transformation Result Providing Service)

Since a record of marathon greatly varies according to environment and race conditions, not only entry runners but also city runners strongly desire to know a true record where environmental factors are deducted. Therefore, considered is a service where a record is standardized on the basis of the Black-Box Method, and a standardized record is transmitted to a runner and person involved.

Figure 19:
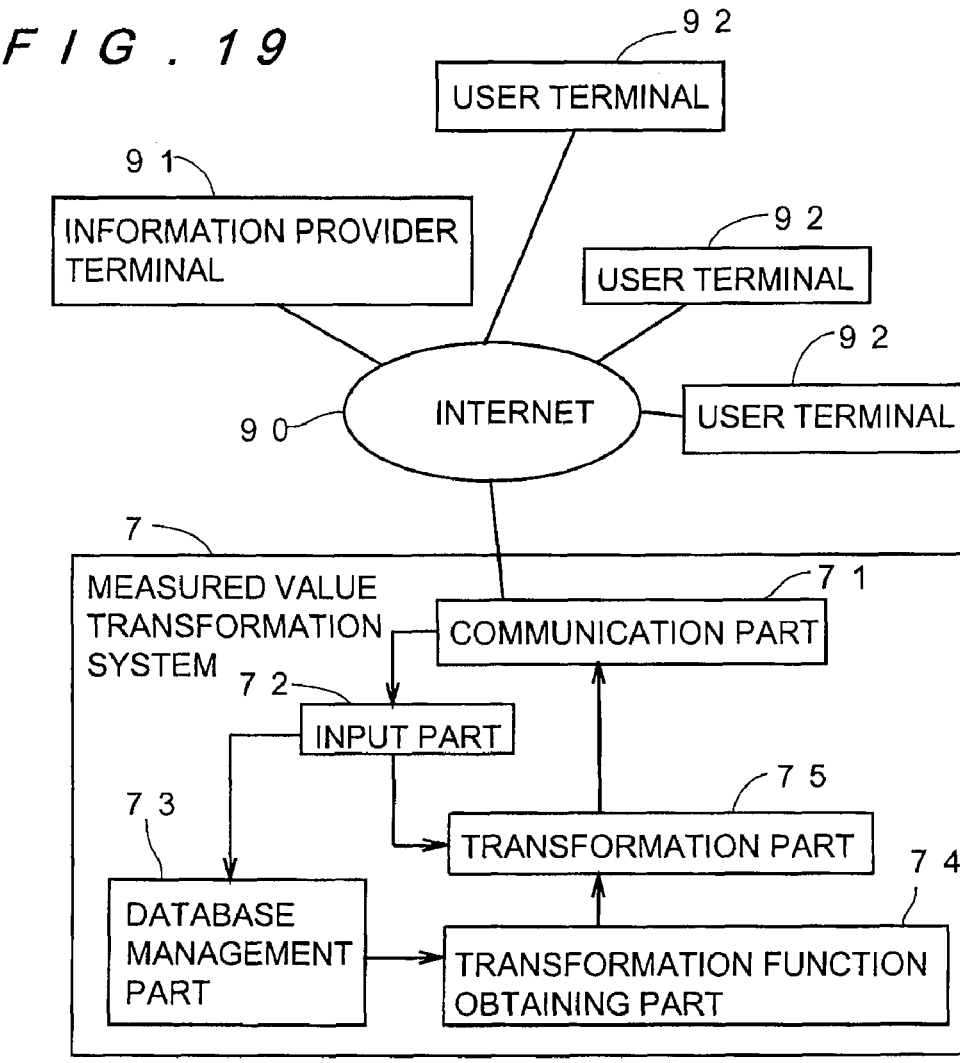
FIG. 19 is a block diagram showing a measured value transformation system.

FIG. 19 is a diagram showing a measured value transformation system 7 for providing standardized records. In the measured value transformation system 7, an actual race time which is a record of a user itself in a marathon race is inputted from a user terminal 92 through an internet 90 which is a computer network, and a transformed and standardized corrected time is transmitted to the user terminal 92 through the internet 90. Also, personal best times $x_i$ and actual race times $y_i$ of respective runners which are required for obtaining a transformation function by using the Black-Box Method are inputted from an information provider terminal 91 of an organizer's end of marathon through the internet 90 to the measured value transformation system 7.

Herein, as discussed above, a plurality of personal best times correspond to the plurality of first measured values in the Black-Box Method, and they are individually measured values. A plurality of actual race times correspond to the plurality of second measured values, and they are collectively measured values. And a plurality of first measured values are results where a plurality of entrants which are measuring objects are respectively measured in a plurality of different first measuring systems where personal best times are obtained, and a plurality of second measured values are results where the plurality of entrants are respectively measured in the same second measuring system which is a target race. Also, in standardization of records of marathon, since a plurality of second measuring systems corresponding to the plurality of entrants are the same, a second reconstituted system derived from a statistical processing of sample points is the same as the second measuring systems.

The measured value transformation system 7 is an operation apparatus having the same construction as a normal computer, a CPU executes computation in accordance with a program, and the CPU, a ROM, a RAM, a fixed disc apparatus, various interfaces, and the like thereby implement functions shown as a communication part 71, an input part 72, a database management part 73, a transformation function obtaining part 74, and a transformation part 75 which are shown in FIG. 19.

In the measured value transformation system 7, first, personal best times $x_i$, actual race times $y_i$, and the like of runners taking part in the target race are received by the input part 72 from the information provider terminal 91 through the internet 90 and the communication part 71, and they are stored in the database management part 73 (Steps S31, S32). Then, a transformation function is obtained by the above-discussed process of the transformation function obtaining part 74. That is, a combination of a personal best time and an actual race time corresponding to each of the plurality of entrants is obtained as a sample point, and a transformation function representing a relationship between a first reconstituted system derived from the plurality of first measuring systems and a second reconstituted system which is the same as the second measuring systems is obtained by statistically processing a plurality of sample points (Steps S33 to S43). The obtained transformation function is set in the transformation part 75.

After the transformation function is obtained, a user taking part in a target race inputs one's own actual race time from a user terminal 92 through the internet 90 and the communication part 71 to the input part 72, the transformation part 75 transforms the actual race time with the transformation function, and then a corrected time which is a transformed value is obtained (Step S44). The corrected time is transmitted to the user terminal 92 through the communication part 71 and the internet 90, and the user can confirm the one's own standardized record.

In elite marathon races, personal best times are officially disclosed in race programs or the like, however, they are not disclosed in city marathon races. Therefore, the measured value transformation system will be practically utilized as a system for providing information with entry runners or the like, where a cooperative framework with organizers of races is established, and corrected times are calculated by receiving personal best times and actual race times.

(Characteristics in Application to Standardization of Records of Marathon)

The Black-Box Method has the following characteristics in application to the standardization of records of marathon.

there is no need to observe environmental factors (simplicity), capable of processing with disclosed information (transparency), corrected times are uniformly determined (uniformity), capable of evaluating actual race times reasonably (fairness), there are temporal and spatial consistency (universality), capable of using regardless of gender, differences in ability of entry runners, the number of entry numbers, time limit, and the like (versatility)

(Verification of Effect of Correction in Cases of Marathon)

Verification results of effect of the Black-Box Method in standardization of records of marathon are described below. Verification of effect is performed from two aspects. One is verification of consistency of records in different races which are held at almost the same time (hereinafter, "spatial consistency"), and the other is consistency of records of different years in the same race (hereinafter, "temporal consistency").

(Verification of Spatial Consistency)

First, the spatial consistency will be verified from results of process of three races (the 2003 Tokyo International Women's Marathon (hereinafter, "Tokyo"), (the 2004 Osaka International Women's Marathon (hereinafter, "Osaka"), (the 2004 Nagoya International Women's Marathon (hereinafter, "Nagoya")) for selection of the Athens Olympic Women's marathon. Herein, since entry qualifications of the national three races of Tokyo, Osaka, and Nagoya are almost the same, for example, "3 hours 15 minutes or faster in full marathon" and the like, it is assumed that there are only slight differences in race ability of entry runners of the three races.

(Change of Scatter Diagram)

Figure 20A:
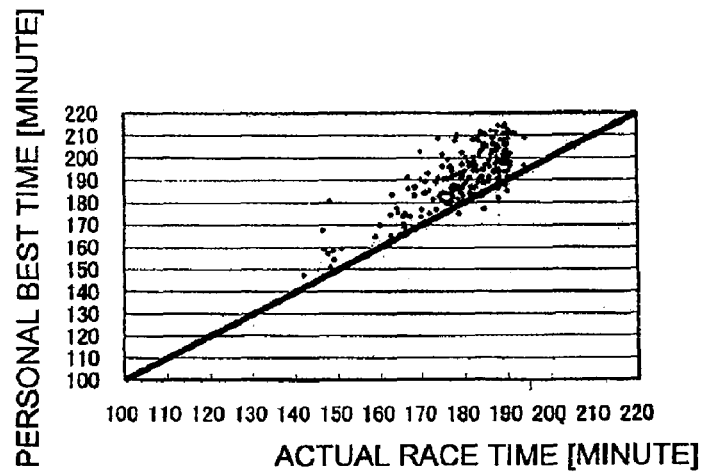
FIG. 20A is a scatter diagram before standardization.
Figure 20B:
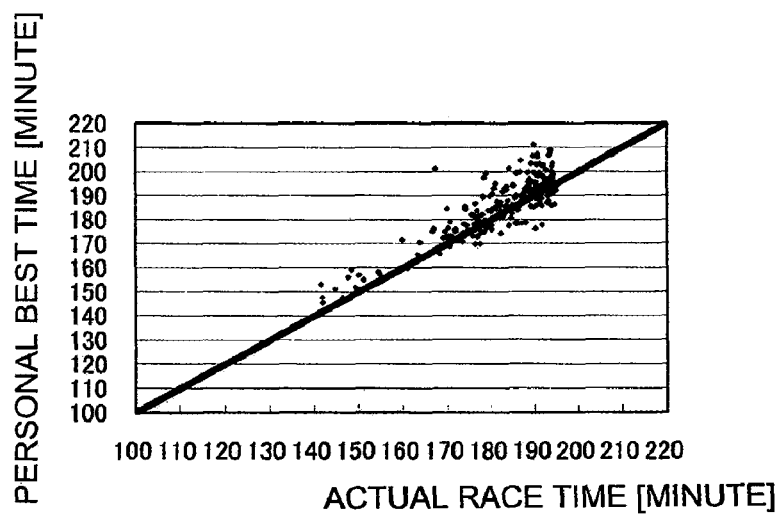
FIG. 20B is a scatter diagram before standardization.
Figure 20C:
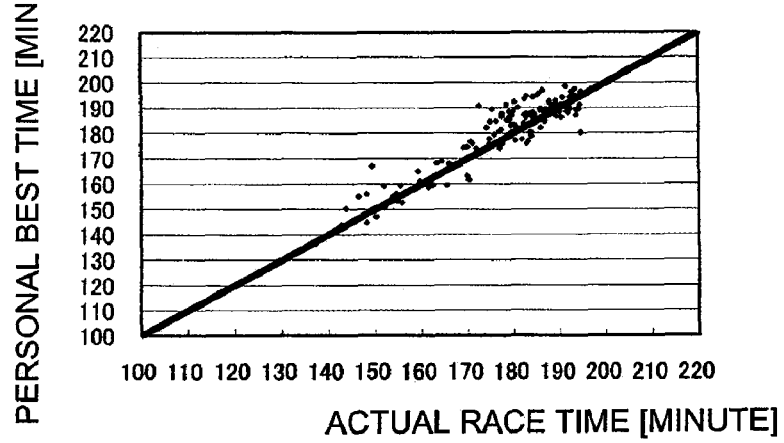
FIG. 20C is a scatter diagram before standardization.

FIG. 20A to FIG. 20F are scatter diagrams showing effect of standardization of records of marathon. FIG. 20A to FIG. 20C show data of the Tokyo, Osaka, and Nagoya before standardization of the records, the horizontal axis corresponds to a personal best time x, and the vertical axis corresponds to an actual race time y. These diagrams show that in the Osaka and Nagoya, the data are distributed around a straight line y=x (i.e., $\eta$=1 in consideration with performance ratio), however, in the Tokyo, the actual race time y is extremely slower than the personal best time x, and almost runners are distributed in an upper area of the straight line y=x (i.e., $\eta$<1).

Figure 20D:
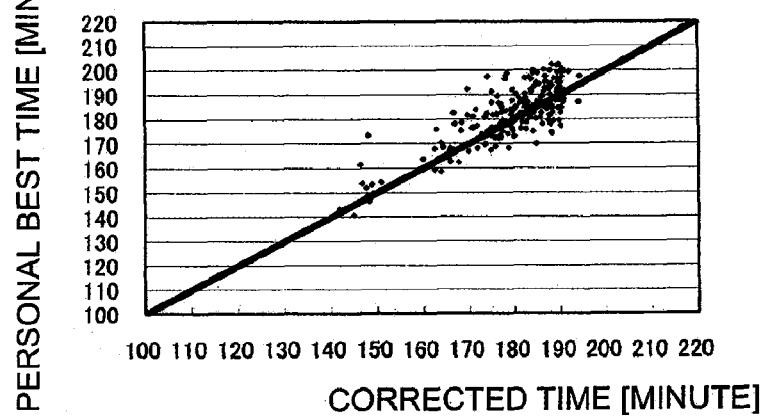
FIG. 20D is a scatter diagram after standardization.
Figure 20E:
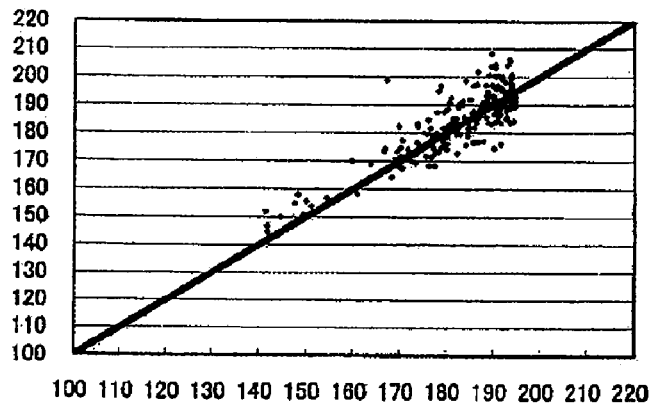
FIG. 20E is a scatter diagram after standardization.
Figure 20F:
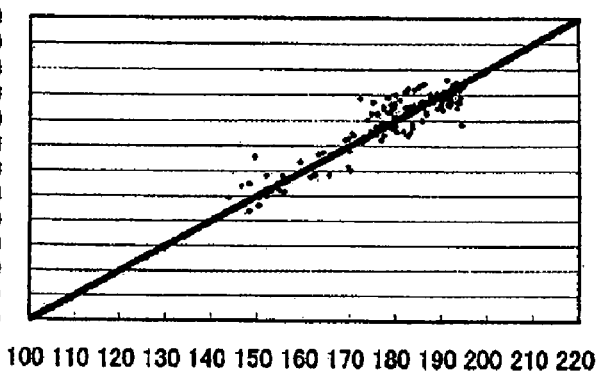
FIG. 20F is a scatter diagram after standardization.

FIG. 20D to FIG. 20F show a relationship between the personal best time x and the corrected time $\tau$. Herein, with respect to the Osaka and Nagoya, there is no large change relative to the scatter diagrams before correction, however, the Tokyo is transformed into a distribution around y=$\tau$ (i.e., $\eta$=1), and effect of standardization relative to differences in race conditions can be confirmed.

(Change in Distribution of Performance Ratios)

Figure 21A:
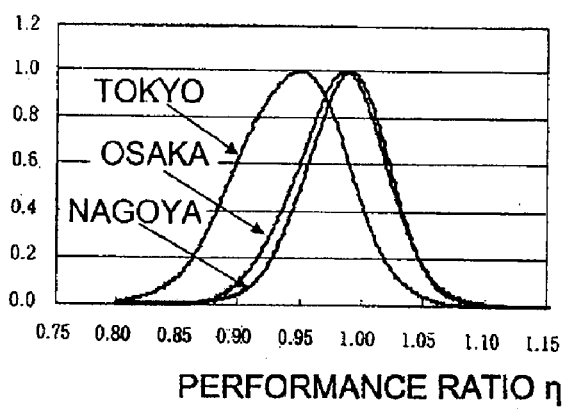
FIG. 21A is a distribution diagram of performance ratios before standardization.
Figure 21B:
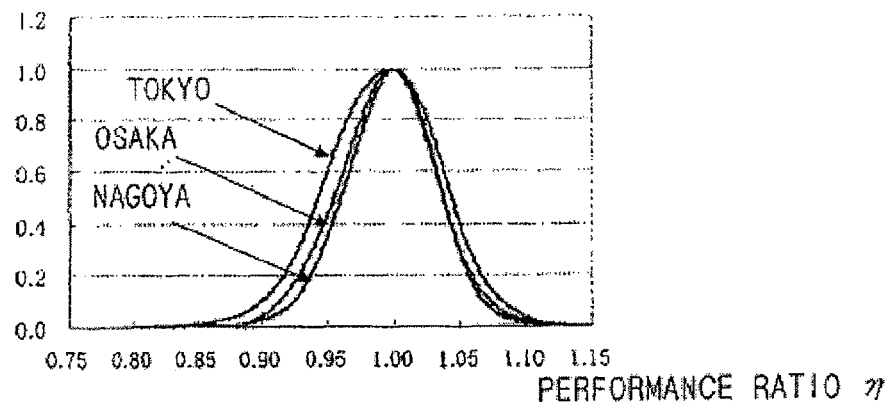
FIG. 21B is a distribution diagram of performance ratios after standardization.

FIG. 21A shows distributions of performance ratio(s) $\eta$ before standardization of the records, and FIG. 21B shows distributions after standardization. Herein, a smoothing operation using a gaussian filter is performed to distributions of the performance ratios which are discrete values, and distributions are standardized by setting a peak value as 1 and displayed. FIG. 21A shows that a peak of the Tokyo is about 4 points lower than those of the Osaka and Nagoya among peaks (Tokyo: 0.950, Osaka: 0.986, Nagoya: 0.991) of distributions of the performance ratio $\eta$. This is a large difference corresponding to 6 minutes in the case of a runner of 2 hours and 30 minutes.

On the other hand, in FIG. 21B after standardization of the records, peaks (Tokyo: 0.998, Osaka: 0.998, Nagoya: 1.00) of distributions of the performance ratio of the three races concentrate near 1.0, and the difference about 4 points between the Tokyo and the other two races before standardization of the records is eliminated. In short, this shows that the standardization process is performed appropriately.

(Sub Three Hour Ratio)

Figure 22:
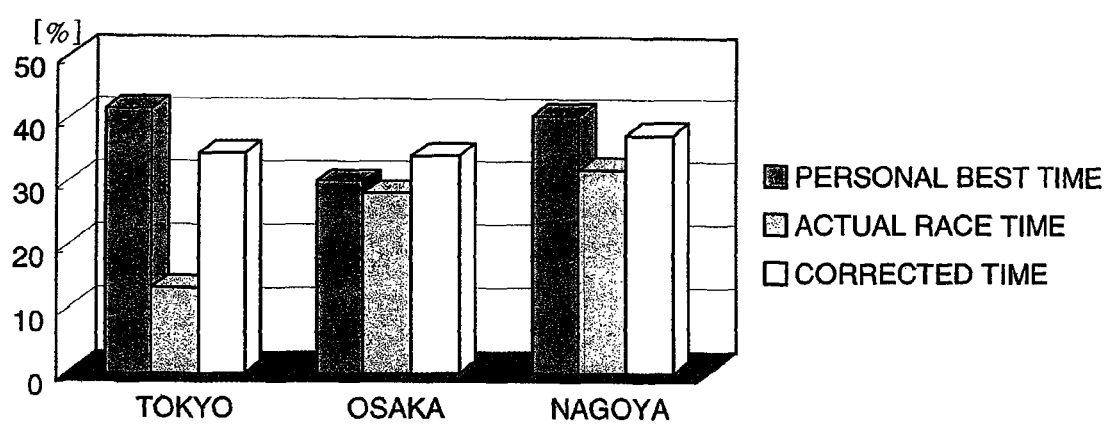
FIG. 22 is a graph showing changes of sub three hour ratios.

FIG. 22 is a graph showing comparison of the ratios of sub three (running marathon in less than 3 hours) hour runners (hereinafter, "sub three hour ratio"). Comparison of the sub three hour ratio is verification of standardization of the records in all the entry runners. Before standardization of the records, that is, in comparison based on the personal best time x and the actual race time y, the sub three hour ratio of the actual race times in the Tokyo (Tokyo: 13.3%, Osaka: 28.2%, Nagoya: 34.3%) is extremely low, relative to the sub three hour ratio of the personal best times (Tokyo: 41.7%, Osaka: 30.2%, Nagoya: 40.6%).

However, by performing the standardization process, in the ratios of sub three of the corrected time $\tau$ (Tokyo: 34.7%, Osaka: 32.1%, Nagoya: 37.7%), the Tokyo is almost the same level as the Osaka and Nagoya. Also in comparison of correlation degrees, a correlation coefficient (r=0.995) between the corrected time $\tau$ and the actual race time y indicates a strong positive correlation in comparison with a correlation coefficient (r=0.564) between the personal best time x and the actual race time y, and this confirms that the corrected time $\tau$ is an evaluation according to ability of the entry runners.

(Personal Best Time Update Rate)

Figure 23:
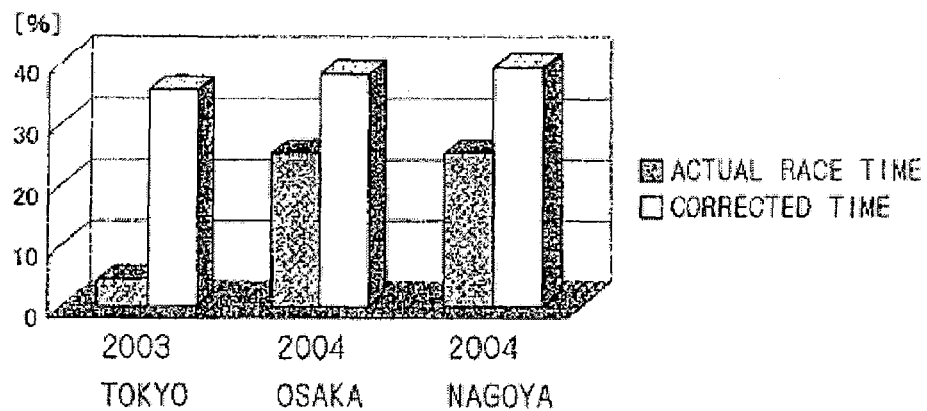
FIG. 23 is a graph showing changes of personal best time update rates.

FIG. 23 is a graph showing comparison of the ratios of runners who renew the personal best time x (hereinafter, "personal best time update rate"). Here, since it is assumed that if the race conditions are equal, the ratios of runners who renew the personal best time x are almost equal, and therefore it can be said that the personal best time update rate is verification of effect of standardization of records in evaluation of performance in individual level. In comparison between the personal best time x and the actual race time y before standardization of the records, there are large differences of the personal best time update rates (Tokyo: 4.4%, Osaka: 25.2%, Nagoya: 25.1%) among the races, and this clearly shows that the records vary according to the differences among the races.

On the other hand, in comparison between the personal best time x and the corrected time $\tau$ after standardization of the records, the personal best time update rates (Tokyo: 35.8%, Osaka: 38.2%, Nagoya: 39.43%) are almost equal in the three races. As such, standardization of a record is appropriately performed regardless of a good personal best time or a bad one, that is, ability of the runner.

(Comparison of Top Runners)

Table 3 shows comparison of results of top runners in the national three races for selection of the Athens Olympics. It is shown in Table 3 that in the actual race time, the second place runner (Naoko TAKAHASHI) in the Tokyo International Women's Marathon is the third among three Olympic candidates, however, in the corrected time, the second place runner has the best result among the three Athens Olympic candidates.

TABLE 3

| Position | Tokyo International Women's Marathon | | Osaka International Women's Marathon | | Nagoya International Women's Marathon | |
| --- | --- | --- | --- | --- | --- | --- |
| | Actual Race Time | Corrected Time | Actual Race Time | Corrected Time | Actual Race Time | Corrected Time |
| 1 | 2:24:47 | 2:20:21 | 2:25:29 | 2:24:23 | 2:23:57 | 2:23:03 |
| 2 | 2:27:21 | 2:22:41 | 2:27:38 | 2:26:29 | 2:24:47 | 2:23:52 |
| 2 | 2:31:10 | 2:26:09 | 2:27:40 | 2:26:31 | 2:27:06 | 2:26:08 |

(Consistency with Athens Olympics)

Table 4 shows comparison between results in the Athens Olympics of entry runners of the Athens Olympics and the records in the national three races for selection of the Athens Olympics. In Table 4, a significant relationship is not seen between the actual race times and the results of the Olympics, however, in comparison of the corrected times and the results of the Olympics, positions of the corrected times in the selection races are the same as positions of the Athens Olympics. Also, a correlation (r=0.833) between the corrected times and the results of the Olympics indicates a strong positive correlation in comparison with a correlation (r=0.776) between the actual race times and the results of the Olympics. In short, this confirms that the corrected times are indices for evaluating ability properly, and they are information which should be emphasized more than the actual race times in selection of runners of the Olympics and the like.

TABLE 4

| Selection Race | Result in Selection Race | | | Result in Athens Olympics | |
| --- | --- | --- | --- | --- | --- |
| | Position | Actual Race Time | Corrected Time | Actual Race Time | Position |
| Tokyo International Women's Marathon | 1 | 2:24:47 | 2:20:21 | 2:28:15 | 4 |
| Nagoya International Women's Marathon | 1 | 2:23:57 | 2:23:03 | 2:28:44 | 5 |
| Osaka International Women's Marathon | 1 | 2:25:29 | 2:24:23 | 2:31:43 | 7 |

(Verification of Temporal Consistency)

Next, the temporal consistency in standardization of the records will be verified on the basis of an analytical result of the Tokyo International Women's Marathon for ten years from 1995 to 2004.

(Sub Three Hour Ratio)

Figure 24:
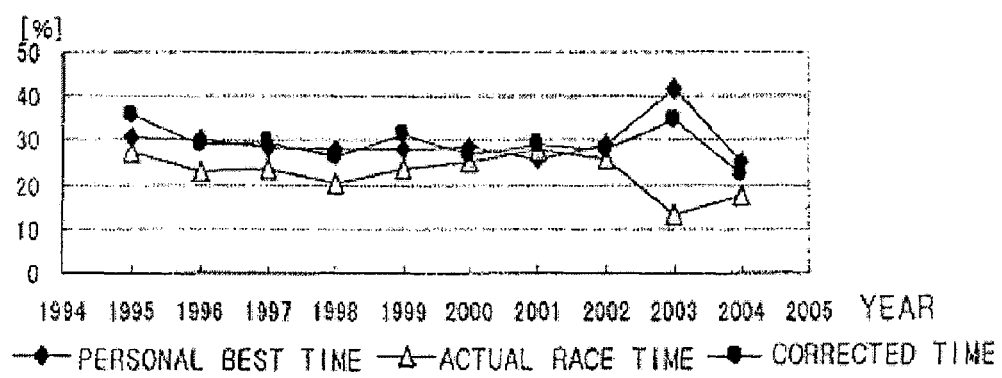
FIG. 24 is a graph showing changes of sub three hour ratios.

FIG. 24 is a graph showing an analytical result over the past ten years of the sub three hour ratio in the Tokyo International Women's Marathon. Also in this result, a correlation coefficient ($r=0.652$) between the personal best time x and the corrected time c is a high value in comparison with a correlation coefficient ($r=-0.577$) between the personal best time x and the actual race time y. It can be said from this result the corrected time $\tau$ is an index where ability is reflected properly.

(Personal Best Time Update Rate)

Figure 25:
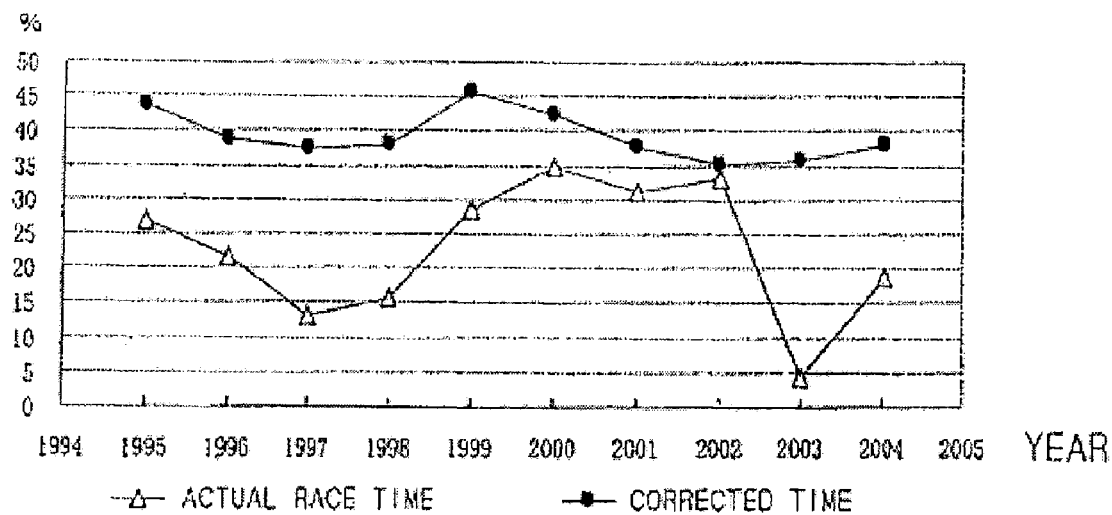
FIG. 25 is a graph showing changes of personal best time update rates.

FIG. 25 shows the personal best time update rates in the Tokyo International Women's Marathon with separating into the actual race time x and the corrected time $\tau$. First, in comparison before standardization of the records, that is, in comparison between the personal best time x and the actual race time y, update rates of the personal best time x have a difference about eight times from the highest (34.82%) to the lowest (4.43%). This result clearly shows that comparing records in different races on the basis of the actual race time is an extremely unfair procedure.

On the other hand, in comparison between the personal best time x and the corrected time $\tau$, update rates of the personal best time x are stable between 35% and 45%. Since the analytical result is one in the race having the same course and entry qualifications, stability in the result confirms reliability of standardization of the records. In short, it can be said that the actual race time y which causes large fluctuations according to race conditions is not suitable for comparison of records in different races, and the corrected time $\tau$ should be utilized for such a use.

(Changes in Individual Record)

Figure 26:
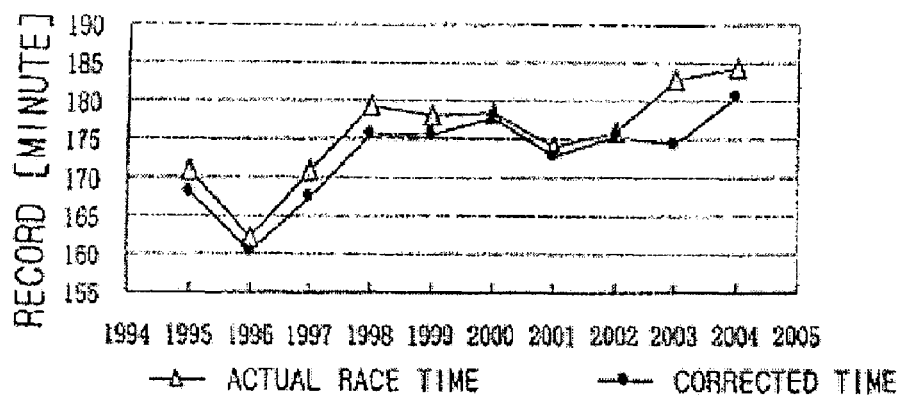
FIG. 26 is a graph showing changes in records of a runner with successive entries.

FIG. 26 is a graph showing changes in records for ten years of a runner with the most entries in the Tokyo International Women's Marathon. This analytical result shows that evaluation of the actual race time y changes a lot every year, and an individual record greatly varies according to race conditions. However, in the corrected time $\tau$, since the race conditions are standardized, it is possible to produce only changes based on individual condition. As such, the corrected time $\tau$ provided by standardization process of records makes it possible for each runner to grasp one's condition quantitatively and objectively and it provides an evaluation or plan of training program with important information.

(Changes in Records of Top Runners)

Figure 27A:
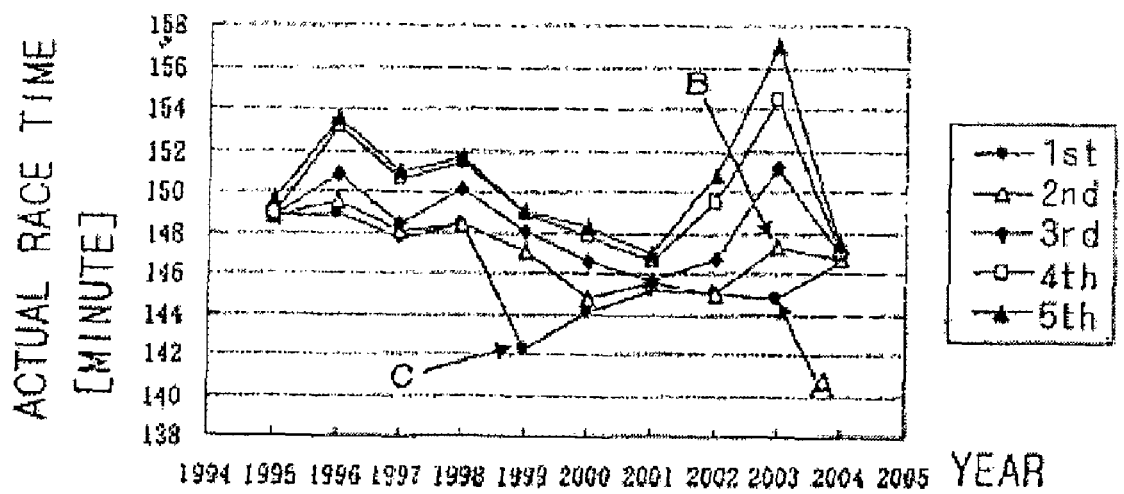
FIG. 27A is a graph showing changes in records of top runners before standardization.
Figure 27B:
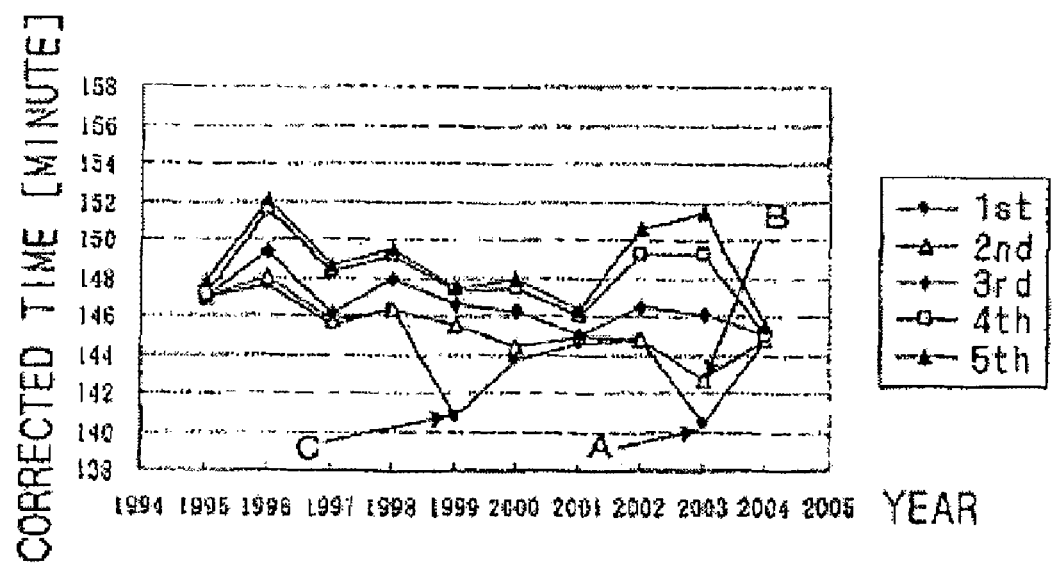
FIG. 27B is a graph showing changes in the records of the top runners after standardization.

FIG. 27A and FIG. 27B are graphs showing interesting data which express changes in records of top runners in Tokyo International Women's Marathon. FIG. 27A shows changes of records of the actual race time y. Though the records of Women's Marathon have significantly advanced recently, it is difficult to find out a statistical trend from changes of records of the accrual race time y of top runners because it is covered by noises which are variation in race conditions. Conversely, FIG. 27B shows changes of the corrected time $\tau$. Since the corrected time $\tau$ is records in standardized race conditions, trend of reduction of records emerges clearly.

And, in history of the Tokyo International Women's Marathon from the first race in 1979 to the 26th race in 2004, a wining time of A (ALEMU) in 2003 is the third record in the history of the above marathon race, and a record of B (Naoko TAKAHASHI) is the 22nd and it is very normal time. Conversely, in the corrected time a, it is shown that the record of A (ALEMU) is the new race record, and the record of B (Naoko TAKAHASHI) is the third best time in the history of the above marathon race next to a race record of C (Eri YAMAGUCHI) in 1999. As such, the corrected time $\tau$ is considered as appropriate evaluation result in light of trend of reduction of records or international past records of both A and B.

(Summary of Standardization of Records of Marathon)

As discussed above, effect of standardization of records of marathon has been verified from the spatial consistency and the temporal consistency. This result confirms that in comparison of records in different races, the corrected time $\tau$ is much more excellent than the actual race time y in all of all entry runners, individuals, and top runners. Also, it is proved that using the corrected time $\tau$ makes it possible to perform comparison over space-time of records of competing races.

(Evaluation of Records in Competing Races)

Correction of the records of marathon has been discussed in the above example, however, in the overall competing races such as long-distance race of athletics, skiing, skating, horse race, motorboat race, car race, auto race, or the like, records are affected by various error factors (hereinafter, "environmental factors") such as weather conditions, properties of course, and the like. Therefore, to properly evaluate ability of competitors or competing objects (for example, machines for car racing) taking part in a competing race, it is necessary to consider influences of these environmental factors. In the transformation method of measured values with the Black-Box Method, since complicated procedure of observation of environmental factors required in analytical method is not needed and transformation result has quantitativeness, the transformation method will effectively function with respect to a problem of evaluation of records in competing races.

Also in a competing race, as the first measured values $x_i$ used are "reference records" (individually measured values) in other races, and as the second measured values $y_i$ used are "race records" (collectively measured values) in a target race to be transformed. And the transformed values correspond to values where abilities are properly evaluated, specifically, the best records (hereinafter, "evaluation records") satisfying a predetermined condition. For example, records of horse race greatly vary according to condition of riding ground. Therefore, as basic information to grasp horse body, the evaluation record is much more suitable than the published race record. Also, there is no doubt that using the evaluation record makes it possible to training and control a horse more reasonably. Naturally, it is considered that the same service can be provided with motorboat race, auto race, and the like. Also, the evaluation record is useful information in evaluation of the capability of a machine, grasping the skill of a driver, or assessment of the disadvantage of a team. That is, since there are considerable needs for correction of records in the overall competing races, it is considered that the service for standardizing information to provide users has high industrial applicability.

(Correction of Fuel Consumption of Car)

As an application in a field of industry, a problem of correction of fuel consumption of car will be discussed. The fuel consumption is an index expressing an economical capacity of car, and in Japan, a fuel consumption at steady 60 km/h, a 10·15-mode fuel consumption, and the like are used as the result (hereinafter, "official fuel consumption") of tests which are performed under the same condition by car manufacturers. The fuel consumption at steady 60 km/h is an amount of fuel consumption in a case where a car runs on a flat paved road without wind in a state of maximum gross vehicle weight at a constant speed of 60 km/h. And the 10·15-mode fuel consumption is a fuel consumption to be measured in a case where after 10 mode drive sampling urban area drive is repeated three times, 15 mode drive sampling highway drive is performed once.

It is often said that official fuel consumption provided by manufacturers deviates from feeling of use of users, and the deviations are systematic errors. If the Black-Box Method is applied to correction of this official fuel consumption, such data provided by manufacturers can be corrected to values according to actual use. In this case, the first measured values are fuel consumptions (hereinafter, "actual fuel consumptions") (individually measured values) when respective users actually drive and the values are expressed as $x_i$ [km/L]. Also, the second measured values are the official fuel consumptions (collectively measured values) and the values are expressed as $y_i$ [km/L]. Herein, there is a high correlation between $x_i$ and $y_i$, however, both values are significantly different.

Conversely, in fuel consumptions corrected by using the actual fuel consumptions $x_i$ and the official fuel consumptions $y_i$ in the Black-Box Method (hereinafter, "corrected fuel consumptions $\tau_i$" [km/L]), they are corrected to values near feeling of use of users. This is extremely useful information not only when a user buys a car, but also when a user drives economically and safety. The case of the fuel consumption is only one example in applications in a field of industry, and the Black-Box Method can be applied to all aspects such as production, distribution, marketing, and the like.

(Correction of Scores of Selected Subject)

As an application in a field of education, a problem in dealing with scores of a selected subject in university entrance examination or the like will be discussed. In university entrance examination, a selected subject system is introduced into the examination. For example, in the National Center Test for University Admissions, examinees must take the examination to select one subject from nine subjects in geography and history and select one subject from five subjects in foreign language. As in each university, selected subjects are included in subjects of entrance examination. However, since there are differences in the difficulty, inequality in score among selected subjects has been a subject of discussion. Conventionally, there is no effective means for correcting this inequality in entrance examination, however, it is possible to solve it adequately by using the Black-Box Method.

In this case, as the first measured values $x_i$ used are "average scores of all examination subjects" (total score/total point allocation×100) (collectively measured values) in the national center test for university, and as the second measured values $y_i$ used are "scores of selected subjects" (collectively measured values). Here, since the scores $y_i$ of selected subjects accompany deviations based on differences in the difficulty of subjects, it is unfair to judge the entrance examination by raw scores. Also in the average scores $x_i$ of all examination subjects, since the entrance examination is the collectively measured values, the values accompany deviations according to differences in questions every year. However, there is a strong correlation between academic ability of an examinee and the average score, and therefore the average score of all examination subjects becomes an evaluation value near ability of the examinee. With the Black-Box Method, it is possible to reasonably correct scores of the selected subjects which greatly vary according to questions, and consequently, it is possible to solve the unfair problem based on differences in the difficulty of the selected subjects.

(Calculation of Consumer Price Index)

Though there is a case where individually measured values are not available depending on measured values, even in such a case, it is possible to apply the Black-Box Method for comparison of the measured values. As uses of comparison of the measured values, "verification of changes of measured values in measuring system which temporally varies" such as a consumer price or "comparison of measured values in measuring systems with different properties" such as a producer price and the consumer price are considered, and an example for calculation of a consumer price index is shown here.

The consumer price index (hereinafter "CPI") is a basis of calculation of payments of public pension such as an employees pension, national pension, and the like, and plays an important role, for example, it influences determination of wages in private companies or the like. The CPI is calculated by performing weighted averaging of individual wealth and service prices with respective weights. Specifically, an equation for obtaining an index $I_t$ in comparison is given as Equation 47 by using i indicating each item as subscript, where $P_o$ is reference-time prices, $P_t$ is a comparison-time prices and $\omega_o$ is weights.

$$I_t = \frac{\sum \frac{P_{ti}}{P_{oi}} \omega_{oi}}{\sum \omega_{oi}} \qquad \text{(Equation 47)}$$

However, without waiting for Boskin Report issued in December 1996, a discrepancy between the CPI and actual feeling has been a problem. Also, in comparison with a wholesale price index (hereinafter, "WPI"), it has been pointed out that the CPI indicates a higher value.

As a cause where the CPI is higher than the actual feeling or the WPI, it has been pointed out there is an item raising the index (hereinafter, "upper bias"). The reason is that with respect to an item where large price variation occurs, consumers take voluntary actions, for example, buying a substitute, reluctant buying, or the like. This discrepancy is exactly the systematic errors, and therefore the Black-Box Method effectively functions also in calculation of the CPI.

In calculation of the consumer price index, as first measured values used are "reference-time prices $P_o$", and as second measured values used are "comparison-time prices $P_t$". A first measuring system where the first measured values are obtained and a second measuring system where the second measured values are obtained are both the collective measuring systems, and they have different measurement time. First, sample points are plotted on a reference-time price-comparison-time price space, and a transformation function expressing their distributions as a whole is introduced. Normally, a function expressed in Equation 48 is introduced.

$$P_i = aP_o \text{ (a: positive real number)} \quad \text{(Equation 48)}$$

Processing against distortion of the sample points are performed, and weights $\omega_{Si}$ of samples and distribution modifying weights $\omega_{Di}$ for randomization of samples are set. Here, as the weights $\omega_{Si}$ of samples, total price (=unit price×number) or the like is considered. Then, the transformation function is determined by a least square method or the like, and a coefficient a of the transformation function is the consumer price index.

The greatest advantage where the Black-Box Method is used for calculation of the consumer price index is that intentionality of samples can be removed. That is, in a conventional method, since intentionality such as defensive consumption of consumers can not be removed in a way of setting the weight $\omega_o$, a value separated from actual feeling is calculated. However, by using the Black-Box Method, it is possible to calculate a value of the CPI with high reliability based on the actual feeling through the effect of the distribution modifying weights $\omega_{Di}$ removing intentionality.

(Evaluation of Medical Act and the Like)

Since there are a gender difference, age difference, individual difference, and the like in a human body, effect of medical act and the like differ individually. If this condition is considered as a problem in measurement, differences in the effect of medical act can be positioned as systematic errors based on different measuring systems of individuals. Therefore, the Black-Box Method can be applied as a means for evaluating the effects of medical act such as dispensing of medicine, rehabilitation exercise, and the like.

A specific method will be explained with verification of effects of dispensing medicine as an example. First, as first measured values $x_i$ used are medical data without medication (for example, blood pressure, blood glucose level, or the like, and hereinafter, "reference measured values"), and as second measured values $y_i$ used are medical data after passage of a certain time from dispensing of medicine (hereinafter, "comparison measured values"). As weights of sample points $P_i(x_i, y_i)$ composed of their combination used are amounts of medicine per unit body weight or the like.

In this case, since all human bodies are different measuring systems, both the first measured values $x_i$ and the second measured values $y_i$ are the individually measured values, and a first reconstituted system $X_R$ and a second reconstituted system $Y_R$ which are based on these medical data are both the quasi-standard systems. That is, a transformation function derived by processing the reference measured values and the comparison measured values is a function representing a relationship between a quasi-standard system $S_s'$ before dispensing medicine and a quasi-standard system $S_y'$ after dispensing medicine, and it is exactly the function representing the effects of dispensing medicine.

As discussed above, by using the Black-Box Method in medical act and the like, it is possible to grasp the effects accurately and quantitatively. This is good news for both medical experts and patients, and it is the means for providing reasonable basis not only from the viewpoint of effective medical care, but also in a challenge of developments of new medicines. Also, it can be widely applied to verification of effects of rehabilitation exercise or training and the like.

(Summary of Applications of Black-Box Method in Transformation of Measured Values)

Applications of the Black-Box Method in transformation of various measured values are summarized in Table 5.

TABLE 5

| Application | Process | First Measured Value | Second Measured Value | Result of Process |
|---|---|---|---|---|
| Record of Marathon | Standardization | Personal Best Time (Individually Measured Value) | Actual Race Time (Collectively Measured Value) | Corrected Time |
| Record of Competing race | Evaluation | Reference Record (Individually Measured Value) | Race Record (Collectively Measured Value) | Evaluation Record |
| Fuel Consumption of Car | Correction | Actual Fuel Consumption (Individually Measured Value) | Official Fuel Consumption (Collectively Measured Value) | Corrected Fuel Consumption |
| Score of Selected Subject | Correction | Average Score of All Examination Subjects (Collectively Measured Value) | Score of Selected Subject (Collectively Measured Value) | Corrected Score of Selected Subject |
| Consumer Price | Comparison | Reference-time Price (Collectively Measured Value) | Comparison-time Price (Collectively Measured Value) | Consumer Price Index |
| Medical Act | Evaluation | Reference Measured Value (Individually Measured Value) | Comparison Measured Value (Individually Measured Value) | Effects of Medical Act |

As shown in Table 5, the Black-Box Method can be applied to various fields, and the construction of the measured value transformation system 7 shown in FIG. 19 can be used in these applications. That is, the measured value transformation system 7 can be utilized in transformation of measured values in various fields where the Black-Box Method is used.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The Black-Box Method in accordance with the present invention is a method where a multivariate complex phenomenon is expressed as a simple input-output model without symbols to be processed, whereby ensuring quantitativeness and validity in a result of process. Since the result of process comprises consistency in measured values, it can be positioned as a methodology for achieving equality and fairness in transformation of measured values.

The present invention is a scientifically significant invention and has applicability in various industries, specifically, applications such as competing races including marathon, fuel consumption of car, score of selected subject, consumer price index, medical act, and the like are illustrated, however, it can be utilized in a technique for transforming various kinds of measured values for different purposes. And such a transformation of measured values can be developed to an information providing service. That is, all measured values transformed by the present invention can be information for items.

The invention claimed is:

1. A measured value transformation method for transforming a measured value, comprising:
    a) a step of preparing a plurality of first measured values which are obtained by respectively measuring a plurality of measuring objects in a plurality of first measuring systems and a plurality of second measured values which are obtained by respectively measuring said plurality of measuring objects in a plurality of second measuring systems, and obtaining a combination of a first measured value and a second measured value corresponding to each of said plurality of measuring objects as a sample point;
    b) a step of obtaining a transformation function representing a relationship between a first reconstituted system derived from said plurality of first measuring systems and a second reconstituted system derived from said plurality of second measuring systems by statistically processing a plurality of sample points of said plurality of measuring objects to remove random errors or remove random and systematic errors from said plurality of first measured values and said plurality of second measured values; and
    c) a step of obtaining a transformed value by transforming a second measured value with said transformation function, said transformed value corresponding to said second measured value in said first reconstituted system.

2. The measured value transformation method according to claim 1, wherein
    said plurality of first measuring systems are different measuring systems from one another and said plurality of second measuring systems and said second reconstituted system are the same.

3. The measured value transformation method according to claim 2, wherein
    said plurality of measuring objects are competitors or competing objects in competing races and said plurality of first measured values are the best records which satisfy a predetermined condition.

4. The measured value transformation method according to claim 3, wherein
    said plurality of measuring objects are long-distance runners and said plurality of first measured values are personal best times.

5. The measured value transformation method according to claim 2, wherein
    said plurality of measuring objects are marathon runners, said plurality of first measured values are the personal best times and said plurality of second measured values are actual race times obtained in a target race,
    said plurality of first measuring systems are races where the personal best times are obtained and said reconstituted second measuring system is said target race,
    sample points selected from said plurality of sample points according to a predetermined criterion are weighted and statistically processed in said step b),
    said step b) comprises
    b1) a step of setting a monotonically increasing function as a correlation line, said monotonically increasing function including an undetermined coefficient group which is at least one undetermined coefficient; and
    b2) a step of determining a value group of said undetermined coefficient group on the basis of differences between said plurality of sample points and said correlation line and obtaining said correlation line, where said value group is set, as said transformation function, and
    a standardized record is obtained by transforming a actual race time with said transformation function in said step c).

6. The measured value transformation method according to claim 1, wherein
    said plurality of first measuring systems and said first reconstituted system are the same, and said plurality of second measuring systems and said second reconstituted system are the same and have different measurement time from said first measuring systems.

7. The measured value transformation method according to claim 1, wherein
    sample points selected from said plurality of sample points according to a predetermined criterion are statistically processed in said step b).

8. The measured value transformation method according to claim 1, wherein
    said plurality of sample points are weighted and statistically processed in said step b).

9. The measured value transformation method according to claim 1, wherein
    said step b) comprises
    b1) a step of setting a monotonically increasing function as a correlation line, said monotonically increasing function including an undetermined coefficient group which is at least one undetermined coefficient; and
    b2) a step of determining a value group of said undetermined coefficient group on the basis of differences between said plurality of sample points and said correlation line and obtaining said correlation line, where said value group is set, as said transformation function.

10. The measured value transformation method according to claim 9, wherein
    said step b) further comprises, between said step b1) and said step b2),
    a step of obtaining a plurality of correlation lines passing through said plurality of sample points and moving said plurality of sample points onto a predetermined reference line crossing said plurality of correlation lines by moving said plurality of sample points along said plurality of correlation lines; and a step of obtaining weights of said plurality of sample points in a statistical processing on the basis of distribution of said plurality of sample points on said reference line.

11. The measured value transformation method according to claim 1, wherein
a difference between an input value and an output value of said transformation function monotonically increases or monotonically decreases relative to said input value.

12. The measured value transformation method according to claim 1, further comprising
a step of replacing each of said plurality of second measured values with a proportion between a first measured value and a second measured value of a corresponding measuring object between said step a) and said step b).

13. An apparatus for transforming a measured value, comprising:
an input part for receiving input of a plurality of first measured values which are obtained by respectively measuring a plurality of measuring objects in a plurality of first measuring systems and a plurality of second measured values which are obtained by respectively measuring said plurality of measuring objects in a plurality of second measuring systems;
a transformation function obtaining part for obtaining a combination of a first measured value and a second measured value corresponding to each of said plurality of measuring objects as a sample point and obtaining a transformation function representing a relationship between a first reconstituted system derived from said plurality of first measuring systems and a second reconstituted system derived from said plurality of second measuring systems by statistically processing a plurality of sample points of said plurality of measuring objects to remove random errors or remove random and systematic errors from said plurality of first measured values and said plurality of second measured values; and
a transformation part for obtaining a transformed value by transforming a second measured value with said transformation function, said transformed value corresponding to said second measured value in said first reconstituted system.

14. The apparatus according to claim 13, further comprising
a communication part for communicating with a user terminal through a computer network, wherein
said input part receives a second measured value from a user terminal through said computer network and said communication part, and
a transformed value obtained by said transformation part from said second measured value is transmitted through said communication part and said computer network to said user terminal.

15. The apparatus according to claim 13, wherein
said plurality of first measuring systems are different measuring systems from one another and said plurality of second measuring systems and said second reconstituted system are the same.

16. The apparatus according to claim 15, wherein
said plurality of measuring objects are competitors or competing objects in competing races and said plurality of first measured values are the best records which satisfy a predetermined condition.

17. The apparatus according to claim 16, wherein
said plurality of measuring objects are long-distance runners and said plurality of first measured values are personal best times.

18. The apparatus according to claim 15, wherein
said plurality of measuring objects are marathon runners, said plurality of first measured values are the personal best times and said plurality of second measured values are actual race times obtained in a target race,
said plurality of first measuring systems are races where the personal best times are obtained and said reconstituted second measuring system is said target race,
sample points selected from said plurality of sample points according to a predetermined criterion are weighted and statistically processed in said transformation function obtaining part,
said transformation function obtaining part executes
a) a step of setting a monotonically increasing function as a correlation line, said monotonically increasing function including an undetermined coefficient group which is at least one undetermined coefficient; and
b) a step of determining a value group of said undetermined coefficient group on the basis of differences between said plurality of sample points and said correlation line and obtaining said correlation line, where said value group is set, as said transformation function, and
a standardized record is obtained by transforming a actual race time with said transformation function by said transformation part.

19. The apparatus according to claim 18, further comprising
a communication part for communicating with a user terminal through a computer network, wherein
said input part receives an actual race time from a user terminal through said computer network and said communication part, and
a transformed value obtained by said transformation part from said actual race time is transmitted through said communication part and said computer network to said user terminal.

20. The apparatus according to claim 13, wherein
said plurality of first measuring systems and said first reconstituted system are the same, and said plurality of second measuring systems and said second reconstituted system are the same and have different measurement time from said first measuring systems.

21. The apparatus according to claim 13, wherein
said transformation function obtaining part selects sample points from said plurality of sample points according to a predetermined criterion and statistically processes said sample points selected from said plurality of sample points.

22. The apparatus according to claim 13, wherein
said transformation function obtaining part weights said plurality of sample points and statistically processes said plurality of sample points.

23. The apparatus according to claim 13, wherein
said transformation function obtaining part executes
a) a step of setting a monotonically increasing function as a correlation line, said monotonically increasing function including an undetermined coefficient group which is at least one undetermined coefficient; and
b) a step of determining a value group of said undetermined coefficient group on the basis of differences between said plurality of sample points and said correlation line and obtaining said correlation line, where said value group is set, as said transformation function.

24. The apparatus according to claim 23, wherein
said transformation function obtaining part further executes, between said step a) and said step b),
a step of obtaining a plurality of correlation lines passing through said plurality of sample points and moving said plurality of sample points onto a predetermined reference line crossing said plurality of correlation lines by moving said plurality of sample points along said plurality of correlation lines; and
a step of obtaining weights of said plurality of sample points in a statistical processing on the basis of distribution of said plurality of sample points on said reference line.

25. The apparatus according to claim 13, wherein
a difference between an input value and an output value of said transformation function monotonically increases or monotonically decreases relative to said input value.

26. The apparatus according to claim 13, further comprising
each of said plurality of second measured values is replaced with a proportion between a first measured value and a second measured value of a corresponding measuring object in said transformation function obtaining part.

* * * * *